(12) United States Patent
Gibson et al.

(10) Patent No.: US 12,199,248 B2
(45) Date of Patent: Jan. 14, 2025

(54) ADDITIVES FOR IMPROVING BATTERY PERFORMANCE VIA CATION ADSORPTION

(71) Applicant: Energizer Brands, LLC, St. Louis, MO (US)

(72) Inventors: Andrew Gibson, Newcastle (AU); Scott Donne, Garden Suburb (AU); Steven Limmer, Cleveland, OH (US); Yaser Beyad, Newcastle (AU)

(73) Assignee: Energizer Brands, LLC, St. Louis, MO (US)

( * ) Notice: Subject to any disclaimer, the term of this patent is extended or adjusted under 35 U.S.C. 154(b) by 113 days.

(21) Appl. No.: 17/076,565

(22) Filed: Oct. 21, 2020

(65) Prior Publication Data

US 2021/0119264 A1 Apr. 22, 2021

Related U.S. Application Data

(60) Provisional application No. 62/923,670, filed on Oct. 21, 2019, provisional application No. 63/023,594, filed on May 12, 2020.

(51) Int. Cl.
| | |
|---|---|
| *H01M 10/26* | (2006.01) |
| *H01M 4/24* | (2006.01) |
| *H01M 4/50* | (2010.01) |
| *H01M 6/04* | (2006.01) |
| *H01M 4/42* | (2006.01) |

(52) U.S. Cl.
CPC .......... *H01M 10/26* (2013.01); *H01M 4/244* (2013.01); *H01M 4/50* (2013.01); *H01M 6/045* (2013.01); *H01M 4/42* (2013.01); *H01M 2220/30* (2013.01); *H01M 2300/0014* (2013.01)

(58) Field of Classification Search
CPC .......... H01M 4/50; H01M 4/244; H01M 4/42; H01M 10/26; H01M 6/045; H01M 2300/0014
See application file for complete search history.

(56) References Cited

U.S. PATENT DOCUMENTS

| | | | |
|---|---|---|---|
| 5,300,371 A | 4/1994 | Tomantschger et al. | |
| 2007/0117023 A1* | 5/2007 | Takamura | H01M 4/42 429/406 |

(Continued)

FOREIGN PATENT DOCUMENTS

| | | | |
|---|---|---|---|
| GB | 2553128 | * | 2/2018 |
| WO | WO 2019/090422 | * | 5/2019 |

OTHER PUBLICATIONS

Bailey, Mark R., et al., "Electrochemical Characterization of Proton Diffusion during Discharge and Cycling of γ-MnO₂," J. Electrochem. Soc., 160, 11, pp. A2070-A2077 (2013).

(Continued)

*Primary Examiner* — Laura Weiner
(74) *Attorney, Agent, or Firm* — Alston & Bird LLP

(57) ABSTRACT

Electrochemical cells are provided, wherein a metal ion is adsorbed to a manganese dioxide- or carbon-containing electrode due to the addition of a metal additive to the cell's electrolyte and/or cathode. Methods for preparing such cells are also provided. In particular embodiments, the electrochemical cells are alkaline electrochemical cells, and the electrode contains manganese dioxide.

7 Claims, 37 Drawing Sheets

(56) References Cited

U.S. PATENT DOCUMENTS

2018/0013144 A1* 1/2018 Li .................. H01M 4/505
2018/0233743 A1 8/2018 Schimek et al.

OTHER PUBLICATIONS

Kozawa, Akiya, "On an Ion-Exchange Property of Manganese Dioxide", J. Electrochem. Soc., 106, 7, pp. 552-556 (1959).

International Searching Authority, International Search Report and Written Opinion for International Application No. PCT/US2020/056587, dated Jan. 21, 2021, 12 pages, European Patent Office, Netherlands.

Seo, Joon, Kyo, et al., "Intercalation and Conversion Reactions of Nanosized β-$MnO_2$ Cathode in the Secondary Zn/$MnO_2$ Alkaline Battery", The Journal of Physical Chemistry C, May 3, 2018, vol. 122, No. 21, pp. 11177-11185, ACS Publications, US.

Mehta, Sean A., et al., "Impact of cathode additives on the cycling performance of rechargeable alkaline manganese dioxide-zinc batteries for energy storage applications", Journal of Applied Electrochemistry, Dec. 26, 2016, pp. 167-181, vol. 47, No. 2, Springer, Netherlands.

* cited by examiner

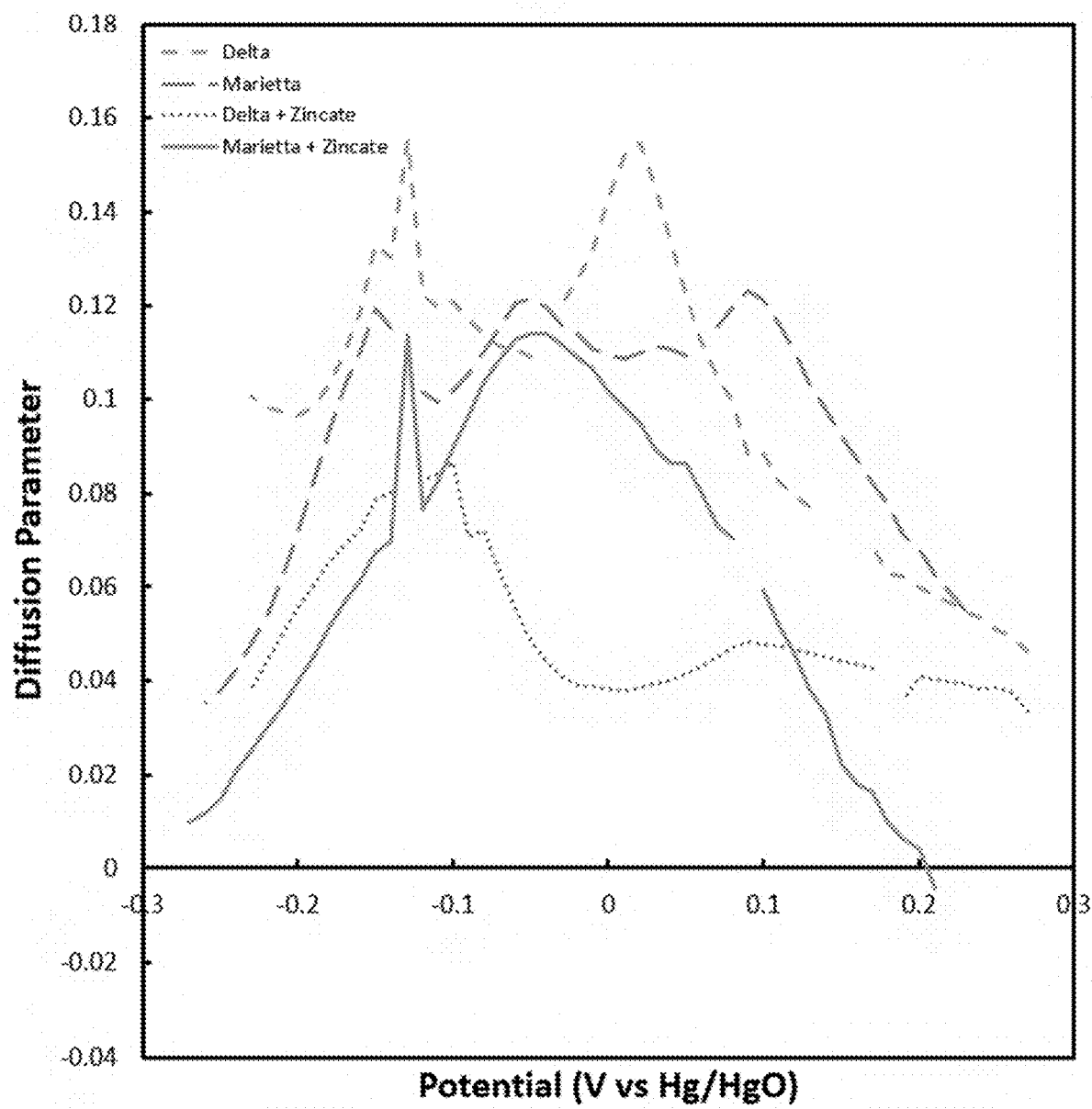

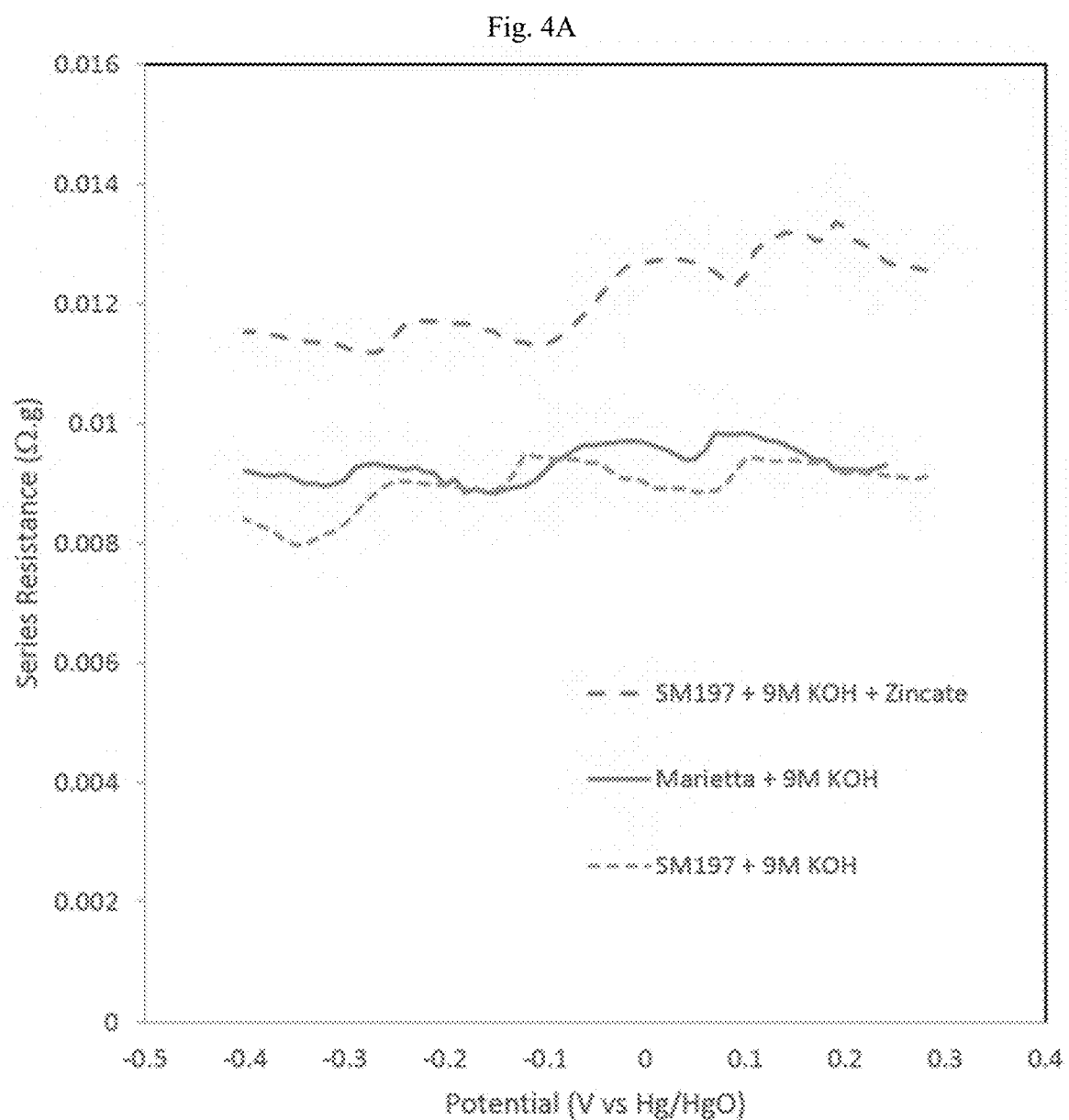

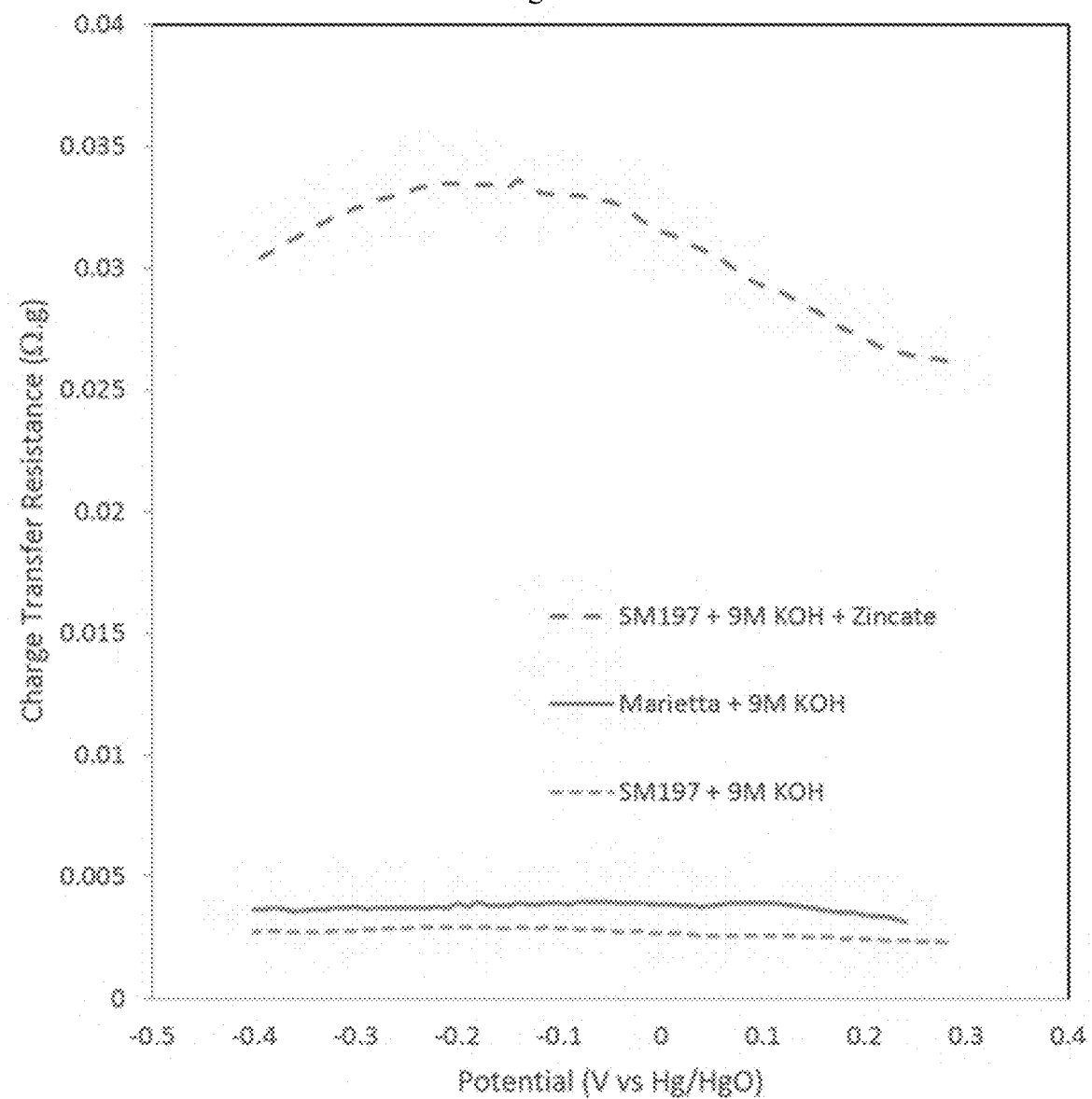

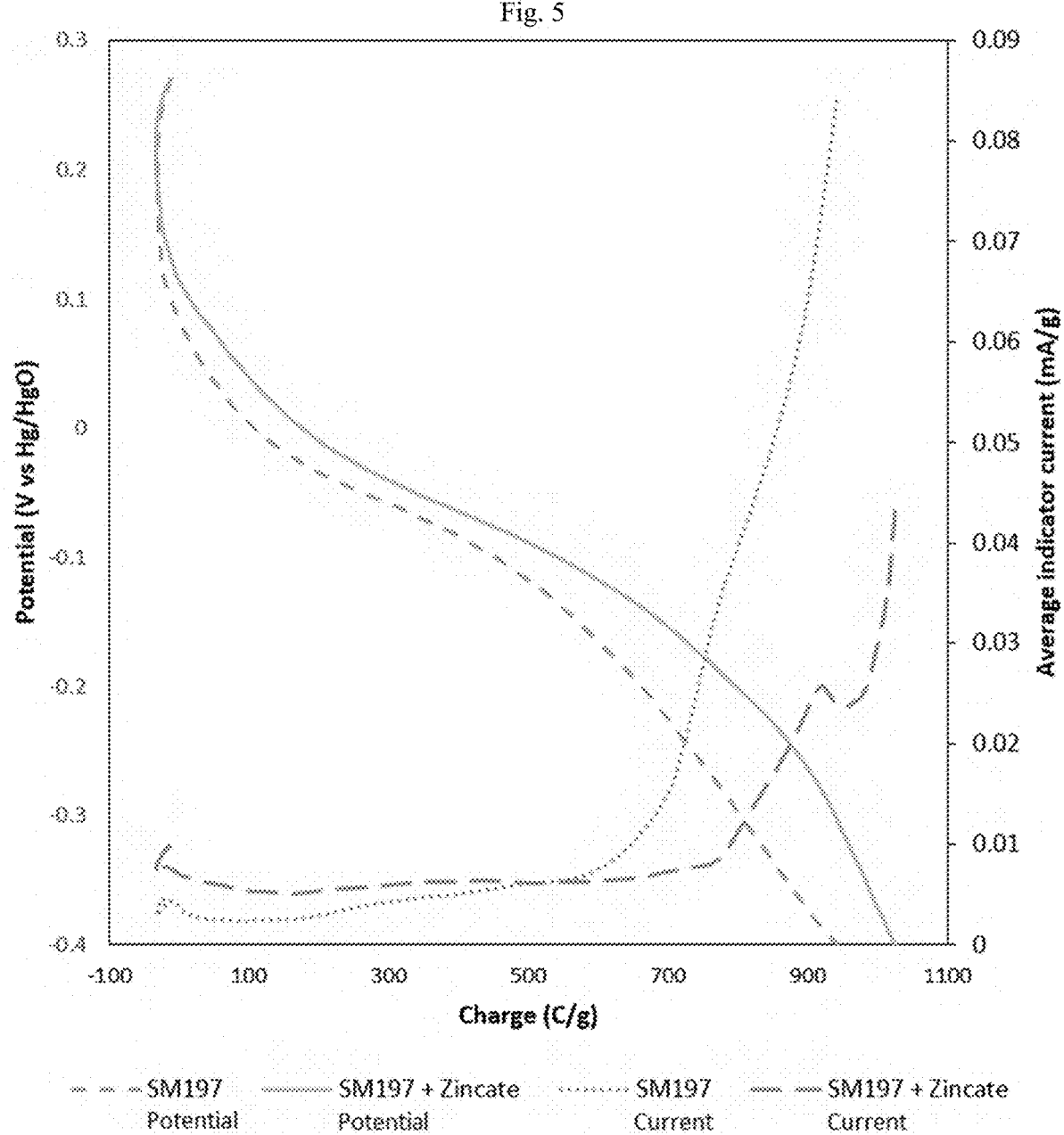

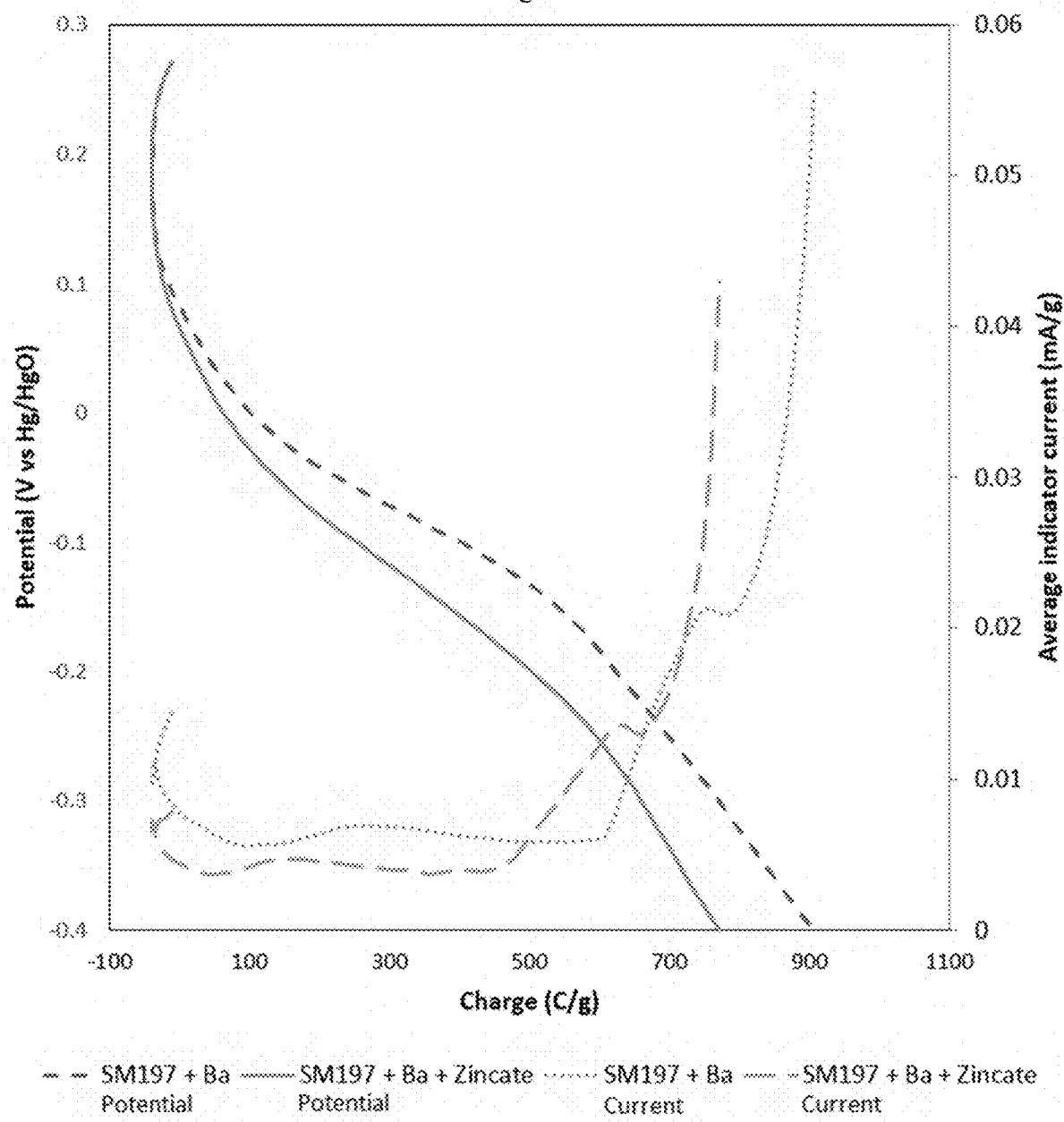

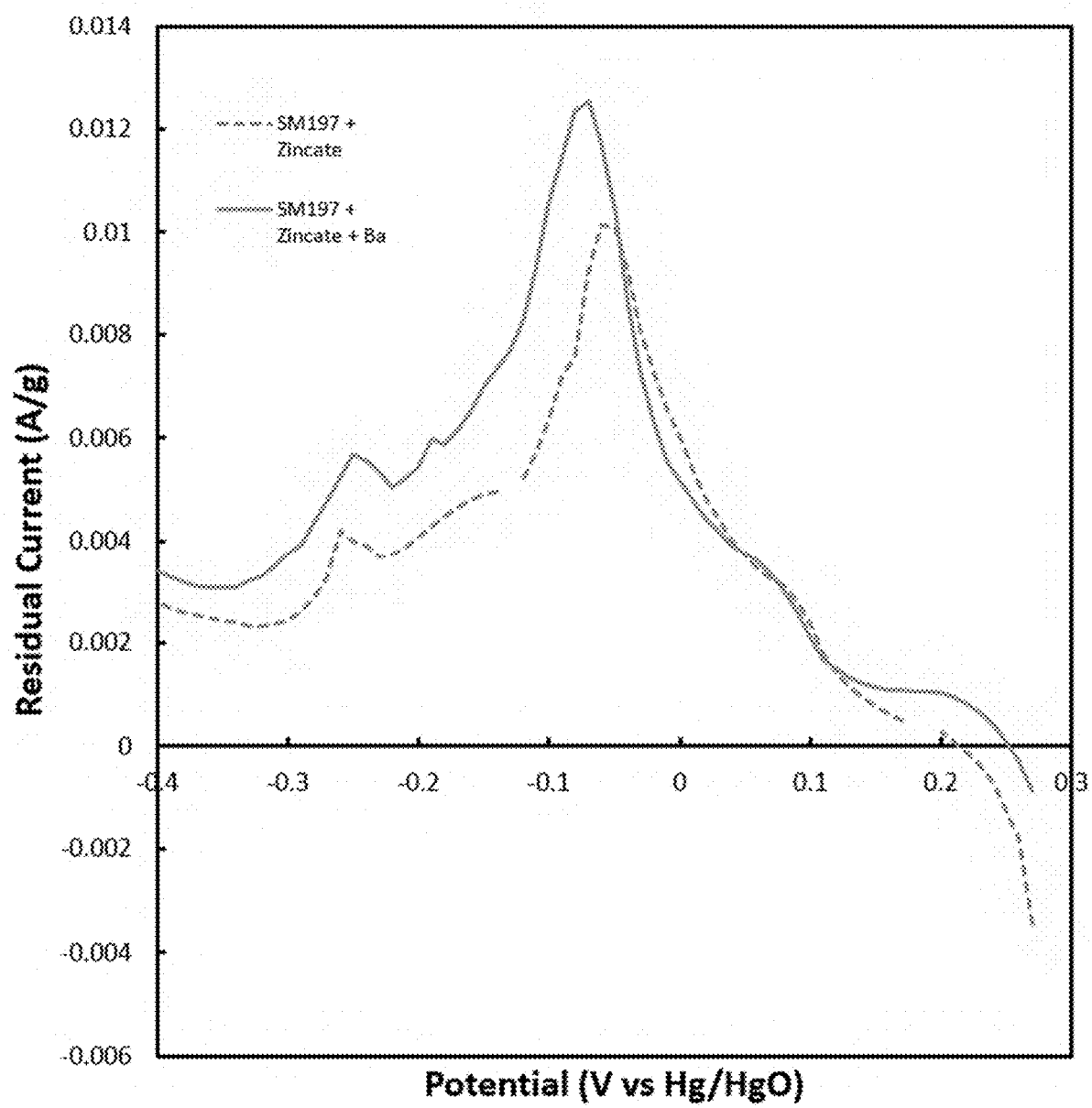

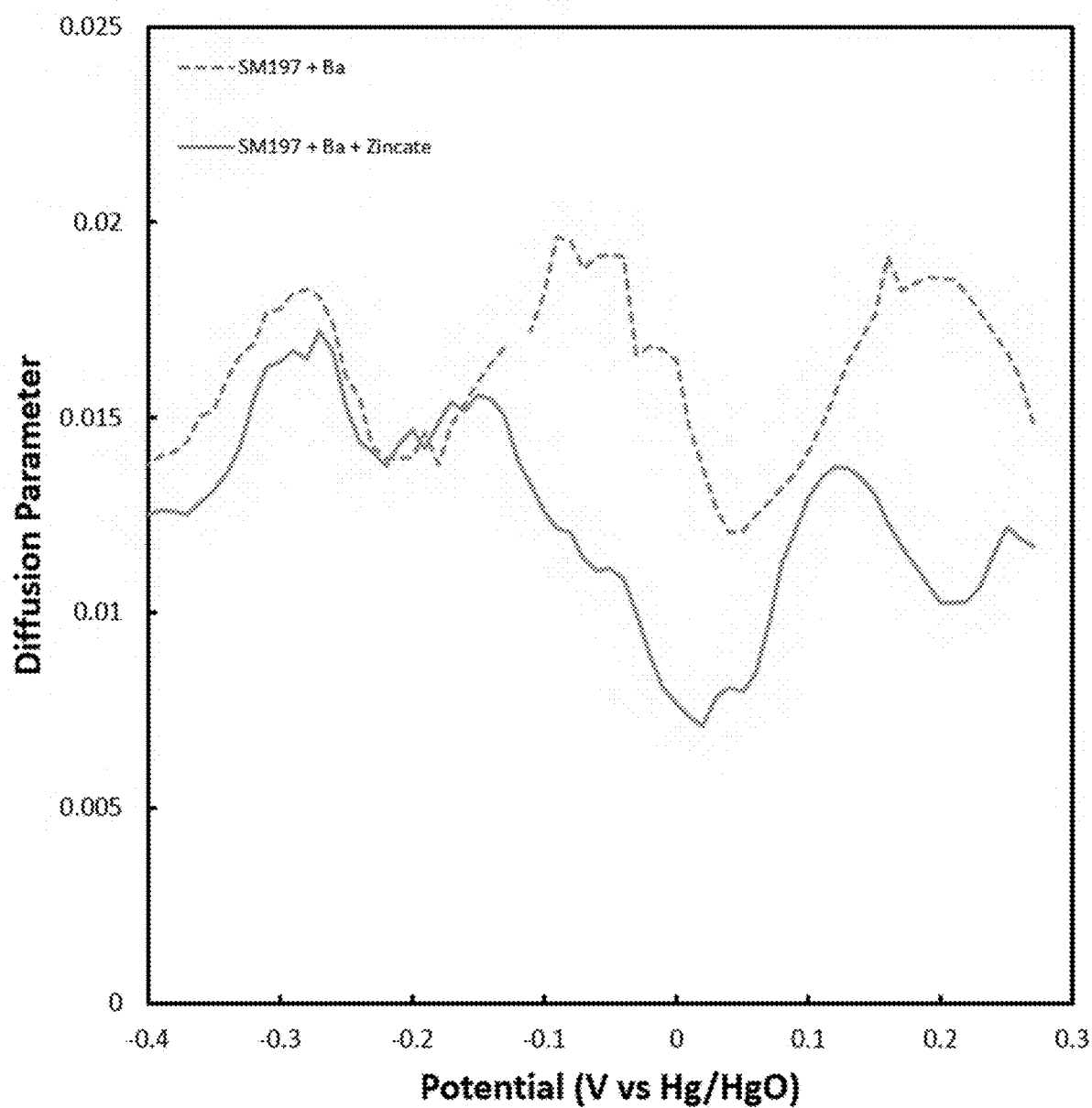

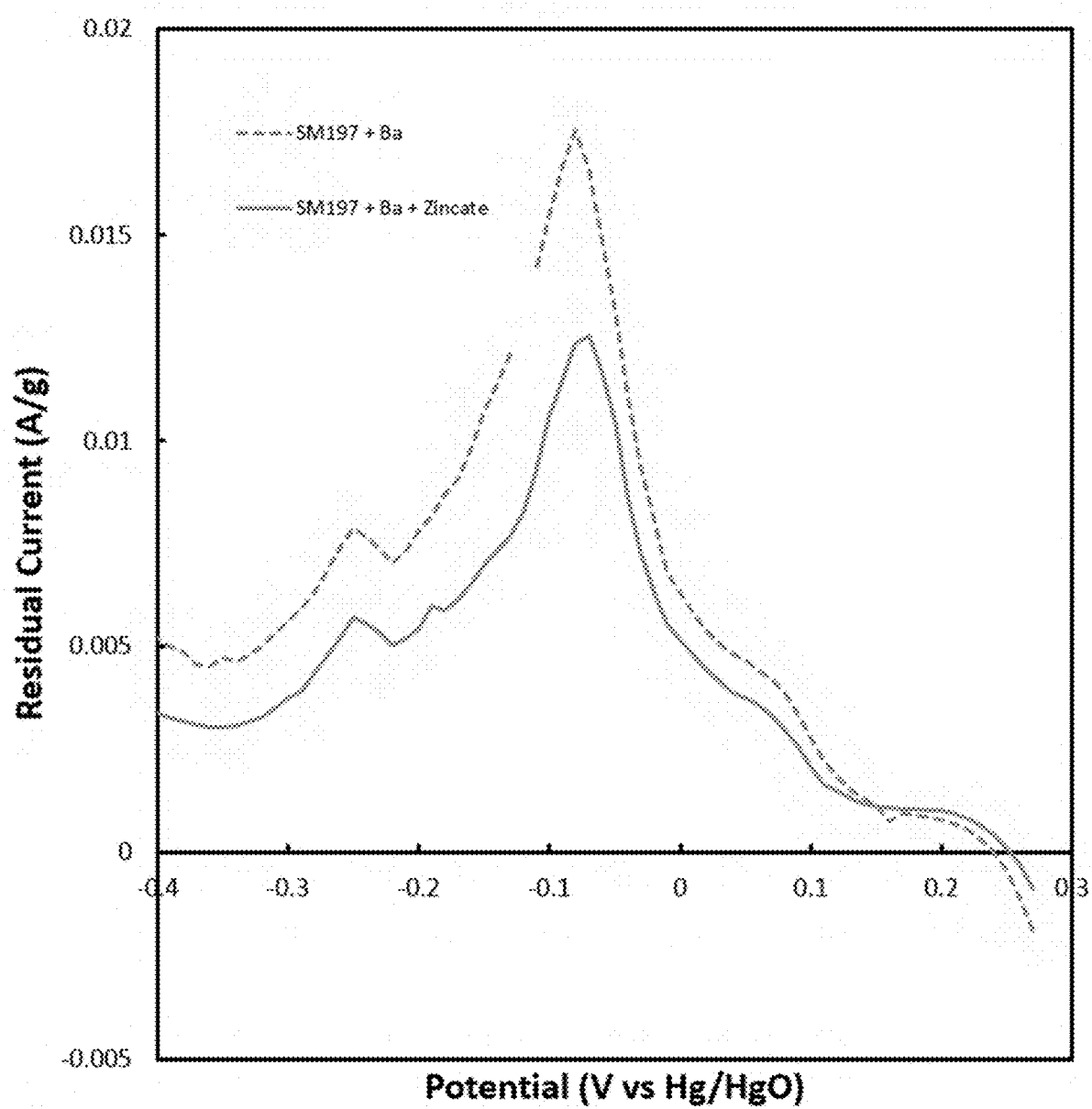

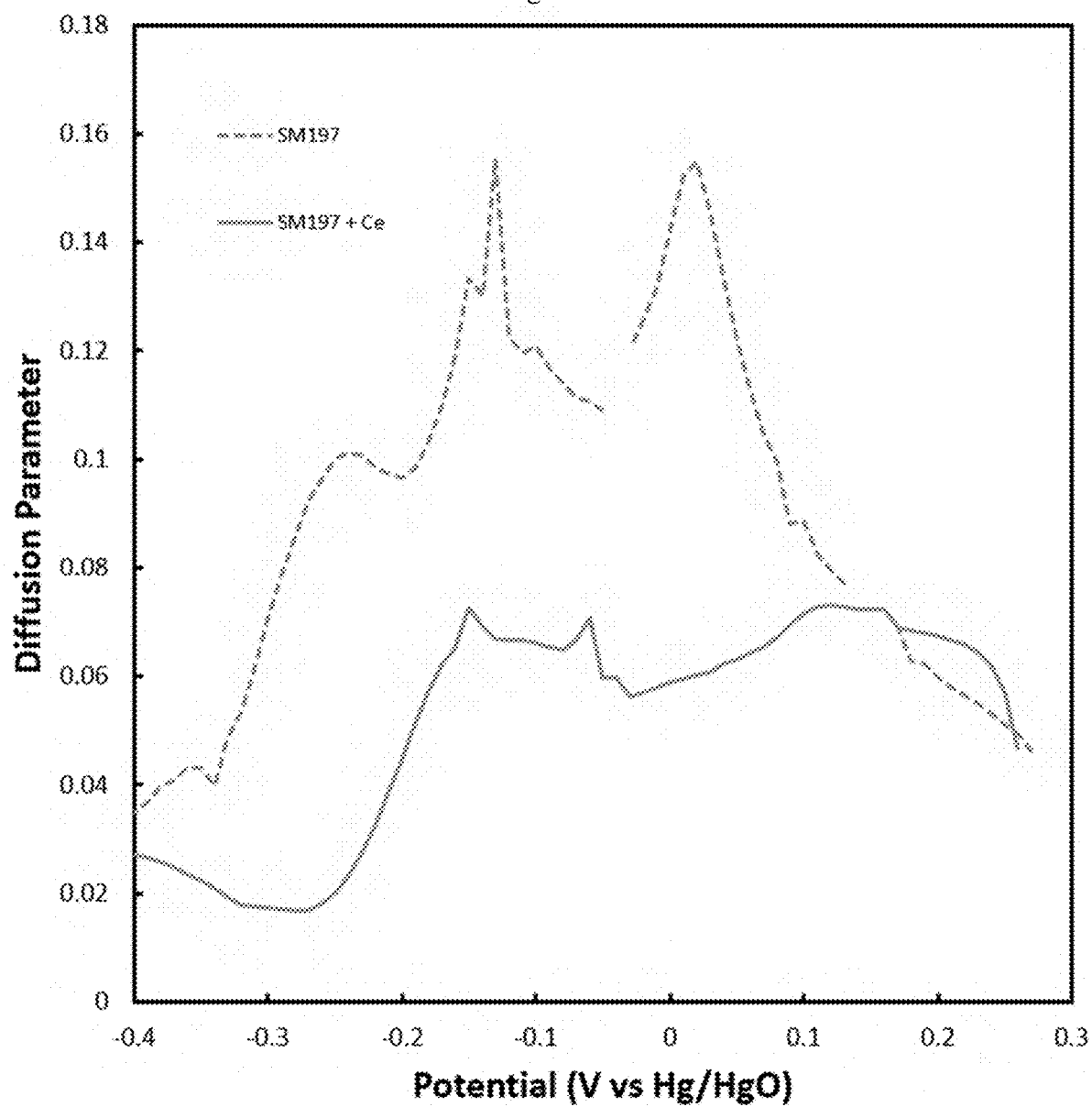

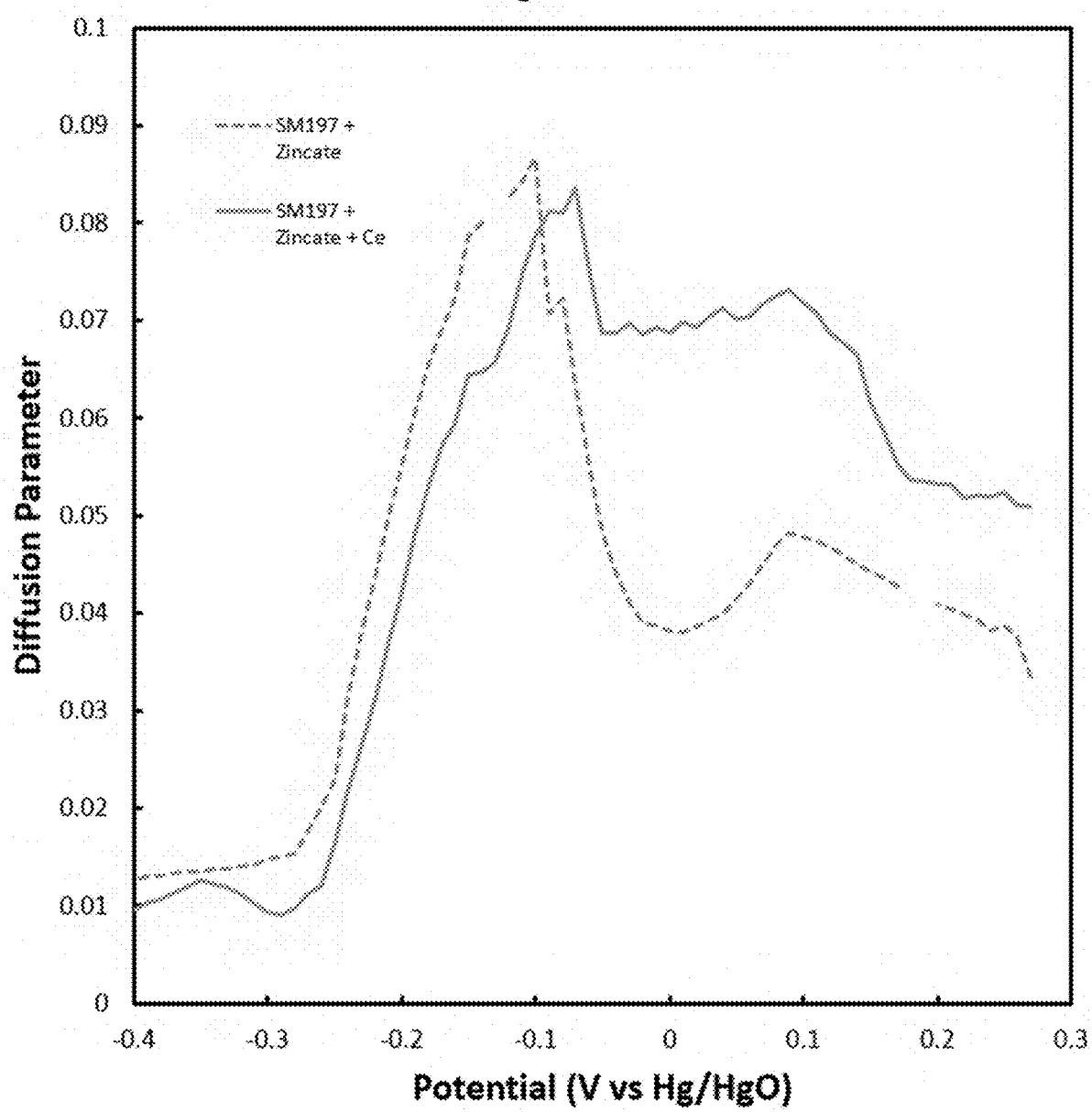

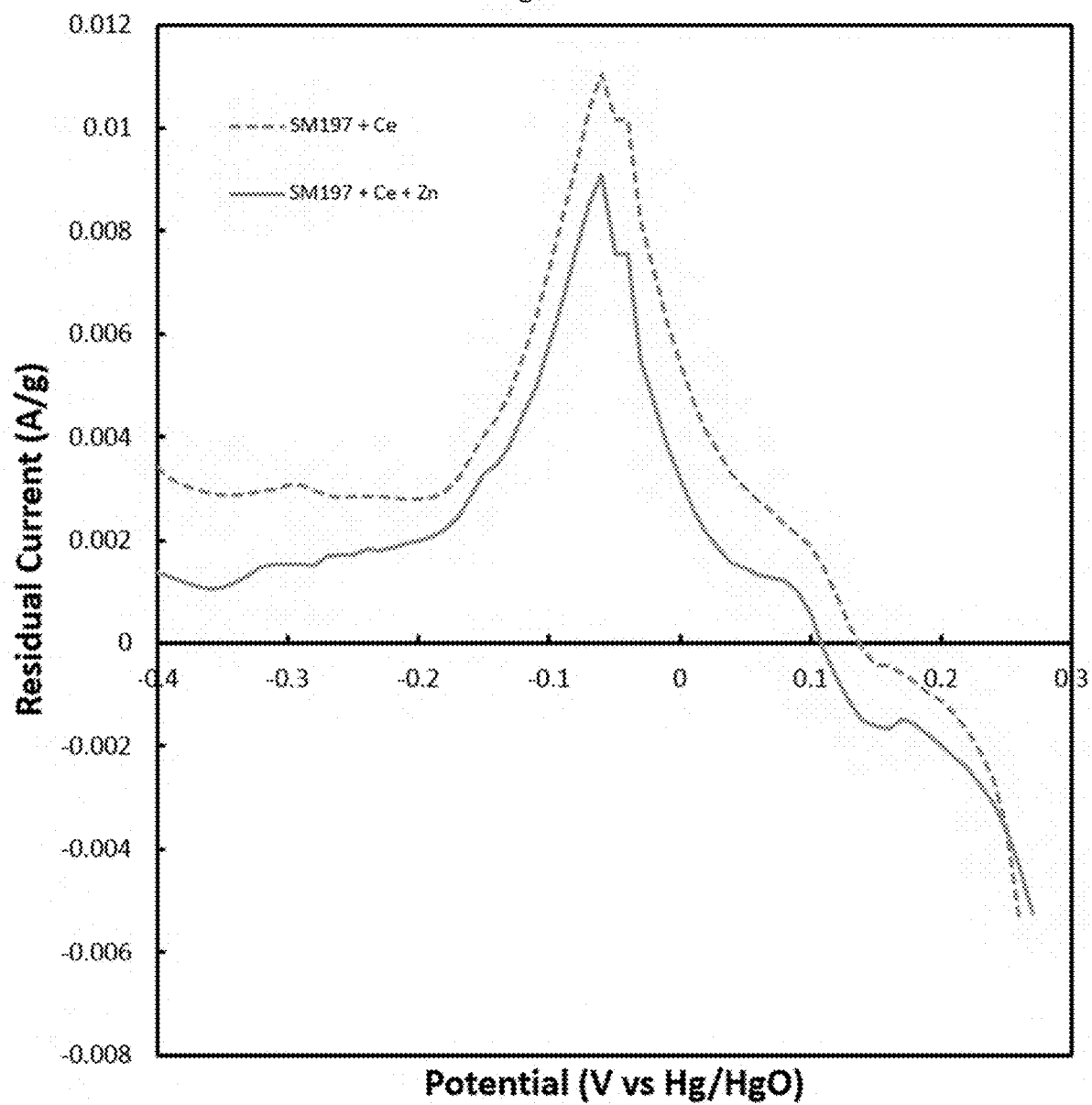

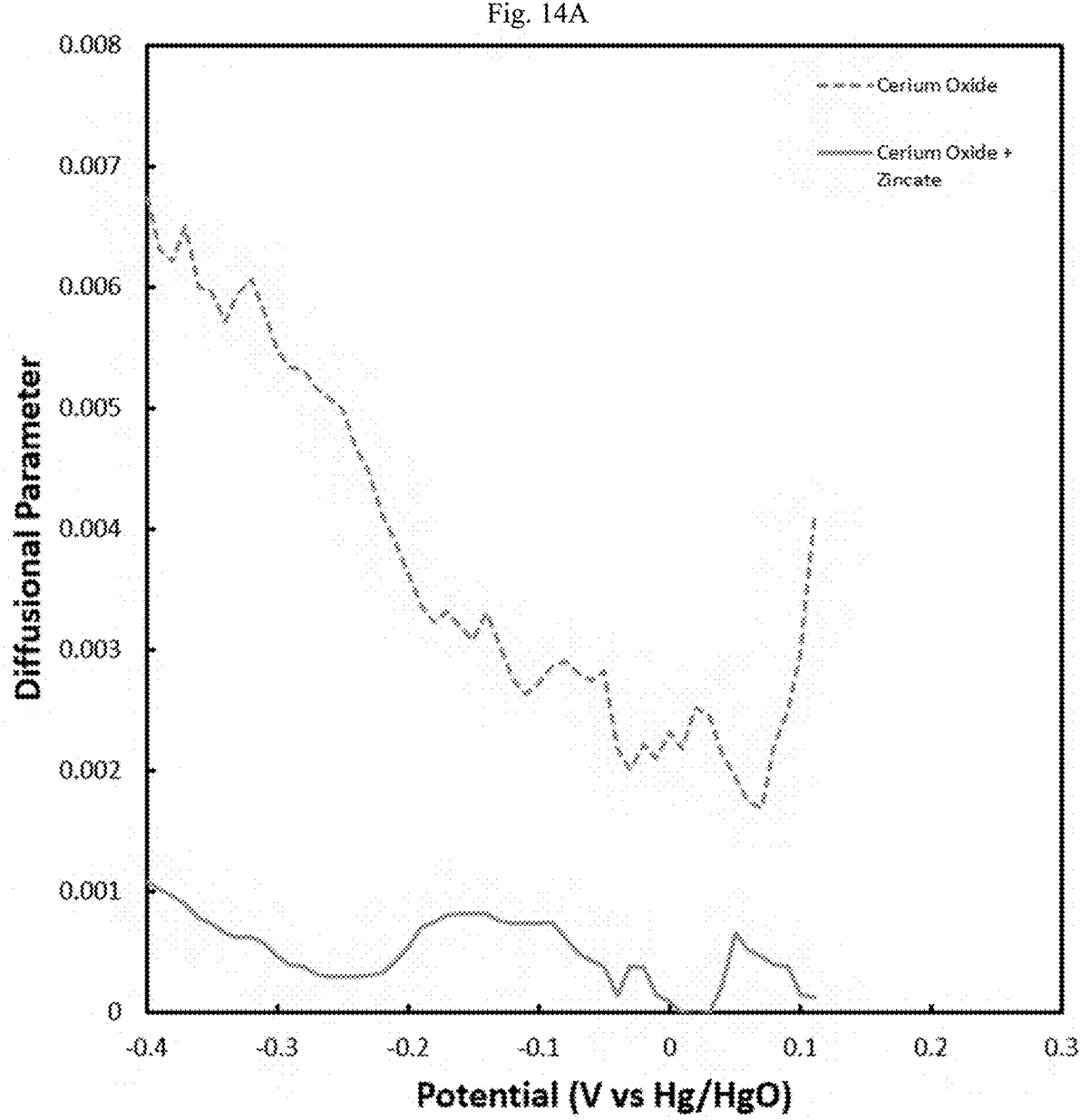

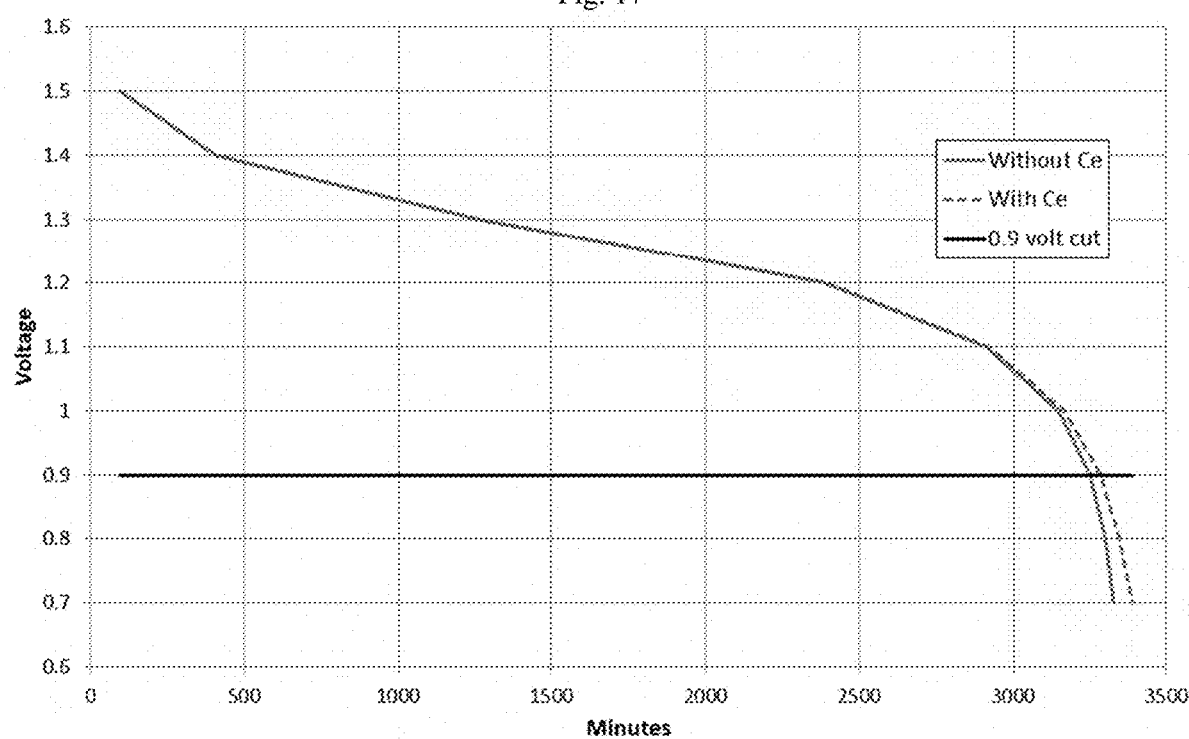

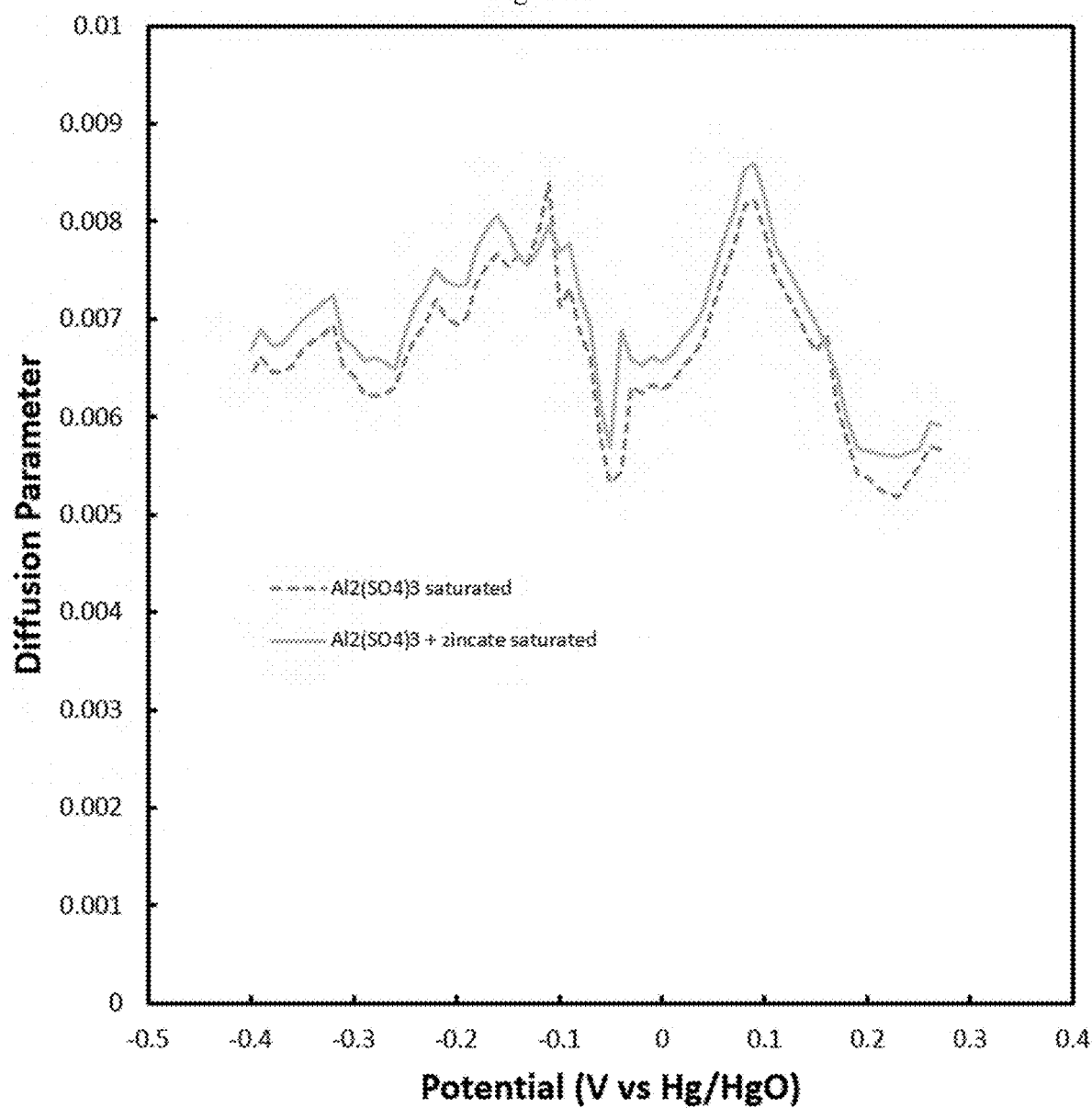

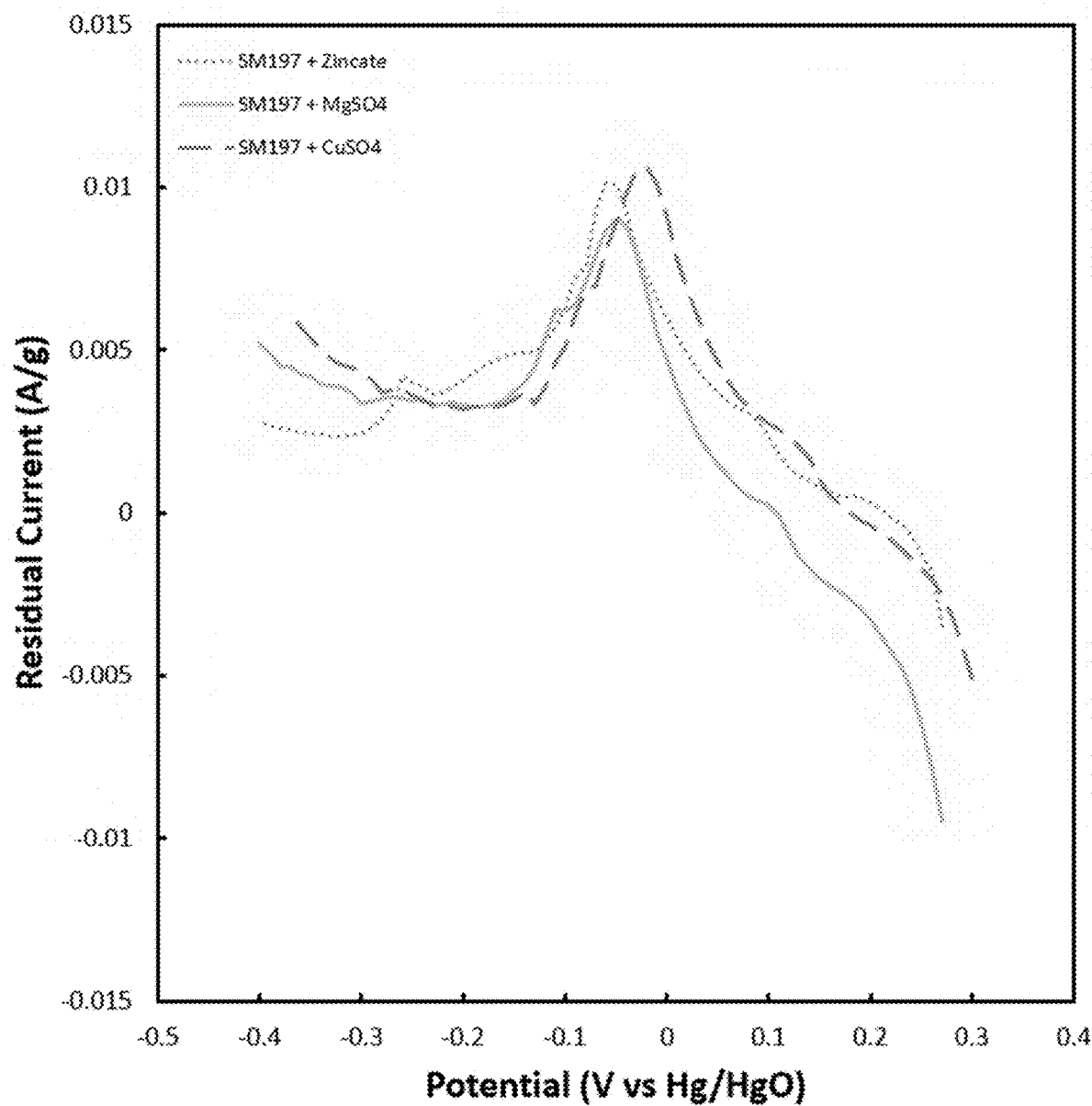

ADDITIVES FOR IMPROVING BATTERY PERFORMANCE VIA CATION ADSORPTION

CROSS-REFERENCE TO RELATED APPLICATIONS

This application claims the benefit of U.S. Provisional Application No. 62/923,670, filed Oct. 21, 2019, and U.S. Provisional Application No. 63/023,594, filed May 12, 2020, the contents of which are hereby incorporated by reference in their entirety.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

As the shape and size of the batteries are often fixed, battery manufacturers must modify cell characteristics to provide increased performance. Attempts to address the problem of how to improve a battery's performance in a particular device, such as a digital camera, have usually involved changes to the cell's internal construction. For example, cell construction has been modified by increasing the quantity of active materials utilized within the cell.

Manganese dioxide ($MnO_2$) is a well-known substance commonly used in electrochemical cells as an active cathode material, often in the form of electrolytic manganese dioxide (EMD). Zinc (Zn) is a common active anode material.

One factor limiting battery performance is the adsorption of species to electrode surfaces, which can inhibit charge transfer. For example, in $MnO_2$/Zn batteries, zincate ions ($Zn(OH)_4^{2-}$) can adsorb to the $MnO_2$ surface, inhibiting charge transfer. Alternatively, Mn(III) ions can dissolve out of the cathode and react with the zincate ions to form hetaerolite ($ZnMn_2O_4$), which can also adsorb to or precipitate onto the $MnO_2$ surface, inhibiting charge transfer.

Similar factors may affect electrochemical cells other than alkaline. For example, in zinc-carbon batteries, which comprise non-alkaline electrolytes, molecules or ions formed by chemical reaction or dissolution may adsorb to electrode surfaces, inhibiting charge transfer.

It is in an effort to overcome the limitations of the above-described cells, and other such cells, that the present embodiments were designed.

BRIEF SUMMARY

An embodiment is an electrochemical cell, comprising:
a) a container; and
b) an electrode assembly disposed within the container and comprising a cathode, an anode, a separator located between the cathode and the anode, and an electrolyte solution; and wherein i) the cathode comprises a metal ion adsorbed on its surface, and/or ii) the electrolyte solution and/or cathode comprises a metal additive, said metal additive comprising a metal ion.

An embodiment is also a method of producing any electrochemical cell described above, comprising the step of i) mixing a metal additive comprising said metal ion with the electrolyte or electrolyte solution.

An embodiment is also a method of producing any electrochemical cell described above, comprising the step of mixing a metal additive with one or more additional cathode components prior to formation of the cathode.

BRIEF SUMMARY OF THE DRAWINGS

FIGS. 3A and 3B show the fitted diffusional parameter and residual current, respectively, for the provided samples of Marietta EMD and Delta EMD SM197 in 9 M KOH, with and without zincate.

FIGS. 4A-4C show series resistance, charge transfer resistance and double layer capacitance, respectively, obtained from impedance experiments performed in between SPECS steps.

FIG. 5 shows discharge curves obtained from sensor electrode experiments in 9 M KOH and 9 M KOH saturated with zincate, calculated from SPECS experiments.

FIG. 6 shows discharge curves and sensor electrode data from SPECS analysis of Ba-saturated electrolytes.

FIGS. 8A and 8B show diffusion parameters and residual currents, respectively, obtained from fitting SPECS experiments in solutions of 9 M KOH saturated with zincate, both with and without Ba.

FIGS. 9A and 9B show diffusional and residual parameters, respectively, obtained from fitting SPECS experiments in solutions of 9 M KOH saturated with Ba, both with and without zincate.

FIGS. 11A and 11B show diffusional and residual parameters, respectively, obtained from SPECS fitting on experiments conducted in 9 M KOH and 9 M KOH saturated with Ce.

FIGS. 12A and 12B show diffusion parameters and residual currents, respectively, obtained from SPECS fitting on experiments conducted in 9 M KOH saturated with zincate, both with and without Ce.

FIGS. 13A and 13B show diffusion parameters and residual currents, respectively, obtained from fitting SPECS experiments in solutions of 9 M KOH saturated with Ce, both with and without zincate.

FIGS. 14A and 14B show diffusion parameters and residual currents, respectively, obtained from experiments conducted on $CeO_2$ in 9 M KOH and 9 M KOH.

FIG. 17 shows discharge data from a number of full cells containing cerium sulfate.

FIGS. 18A and 18B show diffusion parameters and residual currents, respectively, from fitting SPECS experiments conducted on Delta SM197 in 9 M KOH saturated with $Al_2(SO_4)_3$, with and without zincate.

FIGS. 19A and 19B show diffusion parameters and residual currents, respectively, obtained from fitting the SPECS discharge curves in electrolytes containing 9 M KOH and either $MgSO_4$, $CuSO_4$ or $Zn(OH)_4^{2-}$.

DETAILED DESCRIPTION AND DISCUSSION

Figure 1:
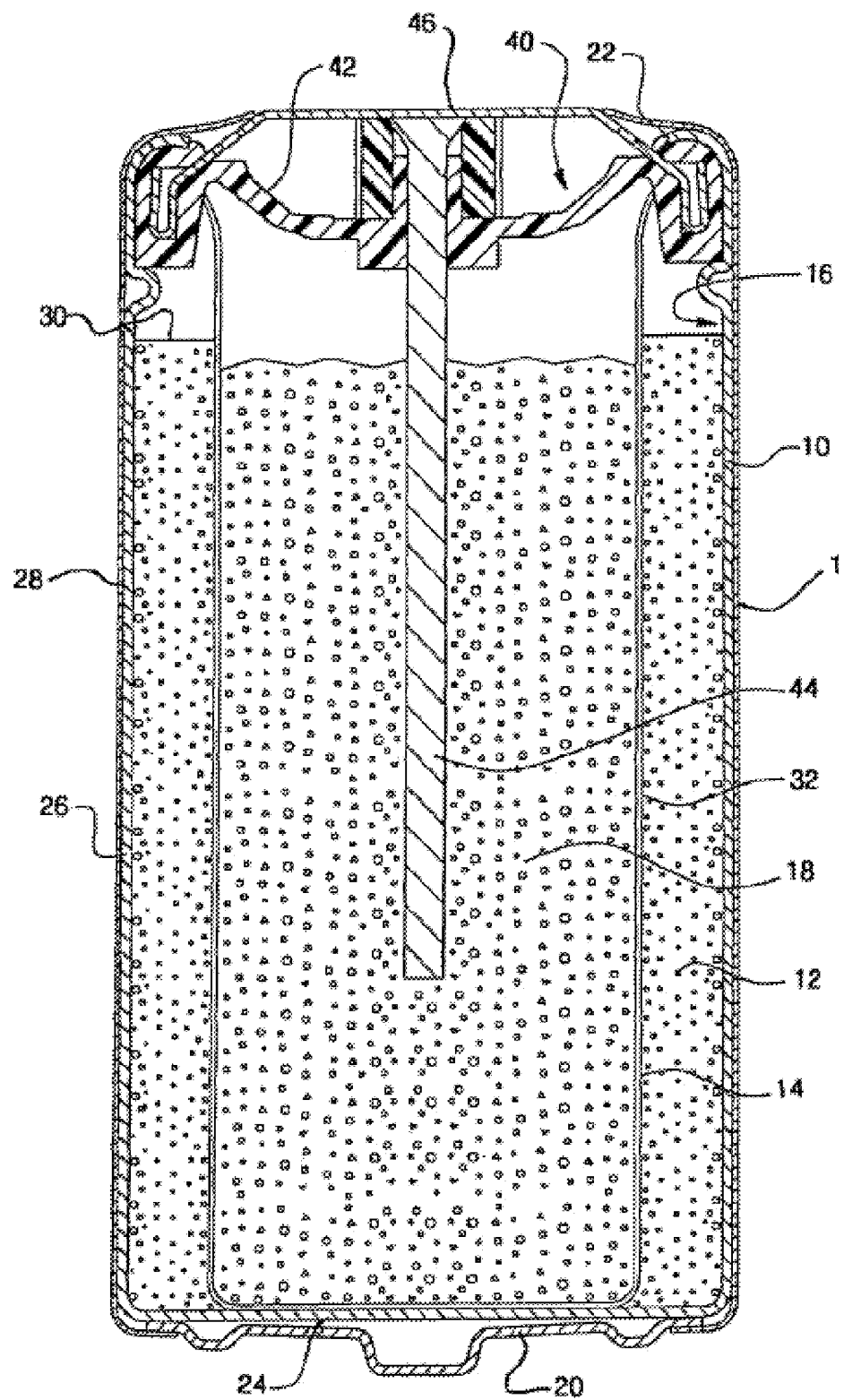
FIG. 1 is a cross-sectional elevational view of an alkaline electrochemical cell of an embodiment.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item. For example, "an organic additive" may refer to two or more organic additives.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths, hundredths, thousandths, ten-thousandths, and hundred-thousandths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 7-10%, 5.1%-9.9%, and 5.01%-9.99%. As another example, "0.00001-1 M" includes 0.00005-0.0001 M and 0.001-0.01 M.

As used herein, "about" in the context of a numerical value or range means within ±10% of the numerical value or range recited or claimed.

As used herein, "metal additive" refers to a metal-containing compound which is added to the electrolyte and/or cathode. Examples are metal salts and metal oxides. As used herein, "metal ion" refers to an ion of any element which may be considered a metal, including, but not limited to, metals, transition metals (any element in groups 3-12 of the periodic table, particularly groups 4-11), lanthanides, actinides, alkaline earth metals, and alkali metals. "Metal salt" refers to any salt formed from a metal ion. "Metal oxide" refers to any compound comprising a metal ion and oxygen in an oxidation state of −2. Examples of metals suitable for the metal salts, metal oxides, and metal ions of the current invention include magnesium (Mg), barium (Ba), nickel (Ni), copper (Cu), aluminum (Al), and cerium (Ce).

As used herein, "synergistic," in terms of an effect, refers to the case where an electrochemical cell comprising two metal ions in the electrolyte (MI1 and MI2) exhibits a greater improvement in specific capacity, or some other property or metric of performance, compared to an electrochemical cell lacking the metal ions than would be expected based on the improvements exhibited by two electrochemical cells, one comprising MI1 and one comprising MI2.

As used herein, "improvement" with respect to specific capacity means that the specific capacity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture etc.).

As used herein, "specific capacity" refers to the total amount of charge in an electrochemical cell when discharged at a particular rate. This is typically measured in ampere hours.

As used herein, "run-time" refers to the length of time that an electrochemical cell will be able to provide a certain level of charge.

An embodiment is an electrochemical cell, comprising:
a) a container; and
b) an electrode assembly disposed within the container and comprising a cathode, an anode, a separator located between the cathode and the anode, and an electrolyte solution; and
wherein i) the cathode comprises a metal ion adsorbed on its surface, and/or ii) the electrolyte solution and/or cathode comprises a metal additive, said metal additive comprising a metal ion.

In an embodiment, the electrochemical cell is an alkaline electrochemical cell, and the electrolyte solution is an alkaline electrolyte solution.

In an embodiment, the cathode comprises manganese dioxide.

In an embodiment, the metal ion is selected from the group consisting of alkaline earth metal ions, transition metal ions, lanthanide metal ions, and boron group metal ions. In a further embodiment, the metal ion is selected from the group consisting of Sn, Co, Bi, V, Ru, Zr, Ga, Be, Ca, Sr, Pb, Ag, Ba, Ce, Al, Ni, Mg, and Cu ions. In a further embodiment, the metal ion is selected from the group consisting of Sn, Co, Bi, V, Ru, Zr, Ga, Ba, Ce, Al, Ni, Mg, and Cu ions. In a further embodiment, the metal ion is selected from the group consisting of Sn, Co, and Bi ions.

In an embodiment, the metal additive is a metal salt additive. In an embodiment, said metal salt additive is a sulfate salt, a carbonate salt, a chlorate salt, a hydroxide salt, a cyanide salt, a cyanate salt, a thiocyanate salt, a nitrate salt, a phosphate salt, a sulfate salt, or a dichromate salt. In a further embodiment, the metal salt additive is a sulfate salt. In an embodiment, the metal salt additive is a tin salt, a cobalt salt, a bismuth salt, a vanadium salt, a ruthenium salt, a zirconium salt, a gallium salt, a barium salt, a cerium salt, an aluminum salt, a nickel salt, a magnesium salt, or a copper salt. In an embodiment, the metal salt additive is selected from the group consisting of $SnO_2$, $CoO$, $Bi_2O_3$, MgO, $V_2O_5$, $RuO_2$, $ZrO_2$, $Ba(OH)_2$, $Ga_2O_3$, $BaSO_4$, $Ce(SO_4)_2$, $Ce_2(SO_4)_3$, $Al_2(SO_4)_3$, $NiSO_4$, $MgSO_4$, and $CuSO_4$. In an embodiment, said metal additive is a metal oxide. In an embodiment, said metal oxide is a tin oxide, a cobalt oxide, a bismuth oxide, a vanadium oxide, a ruthenium oxide, a zirconium oxide, a gallium oxide, a barium oxide, a cerium oxide, an aluminum oxide, a nickel oxide, a magnesium oxide, or a copper oxide. In an embodiment, said metal oxide is selected from the group consisting of $SnO_2$, CoO, $Bi_2O_3$, MgO, $V_2O_5$, $RuO_2$, $ZrO_2$, $Ba(OH)_2$, $Ga_2O_3$, BaO, $CeO_2$, $Al_2O_3$, NiO, $Ni_2O_3$, MgO, $Cu_2O$, or CuO. In a further embodiment, said metal oxide is selected from the group consisting of $SnO_2$, CoO, and $Bi_2O_3$. In a further embodiment, said metal oxide is $SnO_2$.

In an embodiment, the electrochemical cell is a primary cell. In an alternative embodiment, the electrochemical cell is a secondary cell.

In an embodiment, the alkaline electrolyte solution is saturated with the metal ion.

In an embodiment, the metal additive in the alkaline electrolyte solution has a concentration of 0.00001-1 M. In an embodiment, the metal additive has a concentration of 0.00001-0.0001 M, or 0.0001-0.001 M, or 0.001-0.01 M, or 0.01-0.1 M.

In an embodiment, the electrolyte solution comprises potassium hydroxide (KOH), sodium hydroxide (NaOH), lithium hydroxide (LiOH), magnesium hydroxide ($Mg(OH)_2$), calcium hydroxide ($Ca(OH)_2$), magnesium perchlorate ($Mg(ClO_4)_2$), magnesium chloride ($MgCl_2$), or magnesium bromide ($MgBr_2$).

In an embodiment, the electrochemical cell has a specific capacity or runtime that is greater than that of a similar alkaline electrochemical cell which lacks the metal ion. In a further embodiment, the specific capacity or runtime is from 0.5% greater to 100% greater, or from 0.5% greater to 90% greater, or from 0.5% greater to 80% greater, or from 0.5% greater to 70% greater, or from 1% greater to 60% greater, or from 1% greater to 50% greater, or from 1% greater to 40% greater, or from 1% greater to 30% greater or from 1% greater to 20% greater, or from 5% greater to 10% greater. In an embodiment, two or more different metal ions are adsorbed on the surface of the cathode, and the increase in specific capacity or runtime is synergistic.

In an embodiment, the voltage is 0.1 V-2.0 V, 0.2 V-1.9 V, 0.3 V-1.8 V, 0.4 V-1.7 V, 0.5 V-1.6 V, 0.6 V-1.5 V, 0.7 V-1.4 V, 0.8 V-1.3 V, 0.9 V-1.2 V, 1.0 V-1.1 V, or is 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V.

In an embodiment, the anode comprises zinc.

An embodiment is also a method of producing any electrochemical cell described above, comprising the step of i) mixing a metal salt comprising said metal ion with the electrolyte or electrolyte solution.

An embodiment is also a method of producing any electrochemical cell described above, comprising the step of mixing a metal additive with one or more additional cathode components prior to formation of the cathode.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted. Moreover, in certain embodiments, the cathode and anode materials may be coated onto a surface of a separator and/or current collector and rolled to form a "jelly roll" configuration. The described, non-limiting embodiment is directed to an alkaline electrochemical cell comprising manganese dioxide in the cathode as an active material.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, optionally solid zinc oxide, and a surfactant. The negative electrode can optionally include other additives, for example a binder or a gelling agent, and the like.

Zinc is an example main active material for the negative electrode of the embodiments. Mercury, aluminum, silicon, lithium, and magnesium may also be used, in alternate embodiments. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

Zinc suitable for use in the embodiments may be purchased from a number of different commercial sources under various designations, such as BIA 100, BIA 115. Umicore S. A., Brussels, Belgium is an example of a zinc supplier. In a preferred embodiment, the zinc powder generally has 25 to 40 percent fines less than 75 µm, and preferably 28 to 38 percent fines less than 75 µm. Generally lower percentages of fines will not allow desired DSC service to be realized and utilizing a higher percentage of fines can lead to increased gassing. A correct zinc alloy is needed in order to reduce negative electrode gassing in cells and to maintain test service results.

A surfactant that is either a nonionic or anionic surfactant, or a combination thereof is usually present in the negative electrode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the surfactant reduces anode resistance increase caused by the addition of solid zinc oxide because the adsorbed surfactant on solid zinc oxide results in enhanced surface charge density of solid zinc oxide particle surface. The higher the BET surface area of solid zinc oxide, the more surfactant can be adsorbed on the solid zinc oxide surface.

One example surfactant is DISPERBYK-190 from BYK-Chemie GmbH of Wesel, Germany. The surfactant is present in an amount sufficient to disperse the solid zinc oxide, preferably about 0.00064 to about 0.20 weight percent or more, based on the total weight of the negative electrode. DISPERBYK-190 is believed to be a solution including a water soluble, high molecular weight block copolymer including one or more functional groups, believably at least two different types of functional groups. The surfactant has an anionic/nonionic character due to the respective functional groups thereof. It is further believed that the number average molecular weight of a block copolymer DISPERBYK-190 is greater than 1000 measured utilizing gel permeation chromatography. Water solubility may be offset by the presence of a hydrophobic component if present in the electrode composition. In one embodiment, the surfactant is utilized in an amount from about 10 to about 100 ppm and preferably from about 15 to about 50 ppm of zinc utilized in the negative electrode. It is believed that DISPERBYK-190 does not contain any organic solvents and is, therefore, suitable for aqueous systems. DISPERBYK-190 has an acid value in mg KOH/g of 10 and a density of 1.06 g/ml at 20° C.

In an embodiment, the aqueous electrolyte is an aqueous alkaline electrolyte, and comprises an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service. The metal ions in the electrolyte can have a concentration of 0.1-20,000 ppm. In alternate embodiments, the electrolyte may be neutral or salt-based, as in a zinc-carbon cell.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and for example, about 32 weight percent based on the total weight of the negative electrode. Volume percent of the gelled electrolyte may be about 70% based on the total volume of the negative electrode.

In addition to the aqueous alkaline electrolyte absorbed by the gelling agent during the negative electrode manufacturing process, an additional quantity of an aqueous solution of alkaline metal hydroxide, i.e., "free electrolyte" or "alkaline electrolyte solution," is added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining portion of the 29 weight percent KOH solution is injected into the separator lined cavity after the negative electrode has been inserted.

This free electrolyte, in an embodiment, will comprise the metal additive, initially, and is the source of metal ions which will adsorb to the manganese dioxide-containing cathode. In an embodiment, the same metal additive present in the free electrolyte is present in the electrolyte solution incorporated into the cathode. In an embodiment, the free electrolyte has a different concentration of metal additive than does the cathode electrolyte solution. In an alternate embodiment, the free electrolyte and the cathode electrolyte solution have the same concentration of the metal additive. In an embodiment, the metal additive present in the free electrolyte is not present in the cathode.

In an embodiment, the metal additive will be insoluble or have very low solubility in the electrolyte solution at room temperature (~25° C.). In an embodiment, the metal additive will have a solubility of less than $1 \times 10^{-x}$, where x is from 10-75.

Second electrode 12, also referred to herein as the positive electrode or cathode, preferably includes manganese dioxide (typically as EMD) as the electrochemically active material. EMD is present in an amount generally from about 80 to about 92 weight percent and preferably from about 81 to 85 weight percent by weight based on the total weight of the positive electrode, i.e., manganese dioxide, conductive material, positive electrode electrolyte and additives, including organic additive(s), if present. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising EMD, and optionally additive(s), and then inserting the rings into the container to form the tubular-shaped second electrode. The cell shown in FIG. 1 would typically include 3 or 4 rings.

The positive electrode can include other components such as a conductive material, for example graphite, that when mixed with the EMD provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 24. In an embodiment, the O:C ratio ranges from about 12-14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce EMD input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In an embodiment, the cathode comprises the metal additive as a solid. In an embodiment, the metal additive is present as a solid in the cathode at a concentration of 0.1-1000 ppm compared to the total mass of the cathode.

In one embodiment, a positive electrode component (EMD), conductive material, and barium sulfate, and optionally additive(s) are mixed together to form a homogeneous mixture. During the mixing process, an alkaline electrolyte solution, such as from about 37% to about 40% KOH solution, optionally including organic additive(s), is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, and with minimal spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.32:1, such as greater than 1.34:1, and specifically 1.36:1 for impact molded positive electrodes. The A:C ratio for ring molded positive electrodes can be lower, such as about 1.3:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

DISCUSSION AND EXAMPLES

Manganese dioxide has a high cation adsorption ability. Electrolyte solutions were modified with this property in mind, to see how dissolved species in electrolyte would affect EMD performance. Initial tests were performed to determine the effect of zincate ($Zn(OH)_4^{2-}$), $Ba^{2+}$ and $Ce^{4+}$ on material performance. The effects of Ba and Ce have been investigated both with and without zincate.

Experiment 1: Zincate Analysis

The SPECS method (stepped potential electrochemical spectroscopy) was used to investigate the effects of zincate on the performance of two EMDs. These were EMDs from Delta EMD (South Africa), known as SM197 EMD or Delta EMD, and an internal sample manufactured in Marietta, OH (referred to as Marietta EMD). These both had an average particle size of 45 μm. The SPECS method is well known, and explained in further detail in, for example, Bailey et al., "Electrochemical Characterization of Proton Diffusion during Discharge and Cycling of γ-$MnO_2$," *J. Electrochem. Soc.*, 160, 11 (2013).

Black mixes consisting of 0.1 g $MnO_2$+1 g $SF_6$ Graphite+ 0.15 g 9 M KOH were prepared by grinding with a mortar and pestle for at least 5 minutes to ensure homogeneity. These were allowed to reside overnight to allow the KOH to penetrate into the pores of the manganese oxide. Following this, 0.1 grams of the black mix were added to the base of the Teflon lined standard analysis cup cell followed by two separator papers and were compacted with 1 t of pressure for 2 minutes. ~10 mL of 9 M KOH electrolyte and a Hg/HgO electrode were then added.

Figure 2:
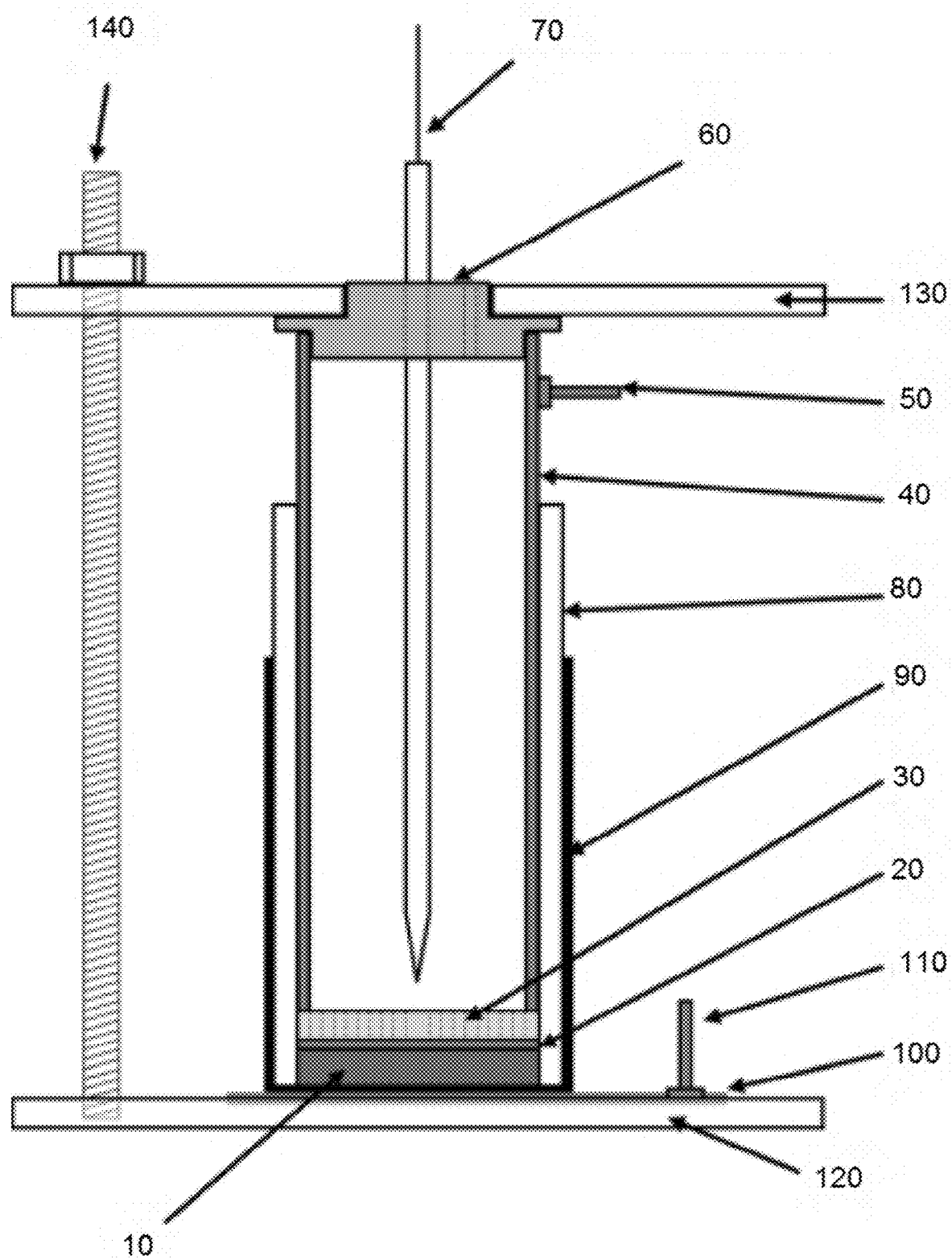
FIG. 2 shows a standard SPECS analysis cup cell.

A diagram of the SPECS experimental cell setup is shown in FIG. 2. The cathode 10 is under separator papers 20 and a perforated disk 30. Above the disk, a stainless steel counter electrode 40 having a first contact point 50 is in contact with a Perspex cap 60, through which a reference electrode 70 is inserted into the cavity of the cell. The stainless steel counter electrode 40 is surrounded by a Teflon sleeve 80, and then further by a C-size battery can 90. Under the battery can sits a brass current collector 100 having a contact point 110. The current collector rests on a base plate 120. The Perspex cap 60 is attached to a cover plate 130. A bolt 140 extends upward from the base plate 120 and through the cover plate 130, and is used to secure the apparatus together.

The cell was allowed to equilibrate at open circuit for 1 h prior to use. Following this rest, the potential was swept at 0.1 mV·s$^{-1}$ from the cell open circuit to the measured open circuit voltage of the EMD. The manganese oxide open circuit voltage was determined by compacting a Pt electrode into a powder sample of the manganese oxide in the presence of a 9 M KOH electrolyte. The electrode was held at this potential for 5 h to allow the manganese oxide to fully recharge to its initial state, as it undergoes some self-discharge in the black mix. Following this the potential is stepped down in a series of 10 mV steps which are held for 2 h. The potential is stepped down to a minimum value of −0.4 V.

The SPECS rest time used was 1 h. Between the SPECS steps, an impedance experiment was conducted at the same potential as the previous SPECS hold. Impedance was collected from 0.1 to 10,000 Hz with a potential oscillation of ±10 mV. The electrode was then held at the step potential for a further 10 minutes after the impedance to allow it to return to the steady state before the next SPECS step.

The resulting current is considered positive, to simplify analysis. This current ($i_{total}$) can be separated into three components, i.e.

$$I_{total} = i_c + i_d + i_r$$

Where $i_c$ is the contribution from capacitive processes, $i_d$ is the current arising from the intercalation and diffusion of protons into the $MnO_2$ structure, and $i_r$ is the residual current arising from various processes such as cell gassing, material dissolution, or slow intercalation reactions.

Figure 3B:
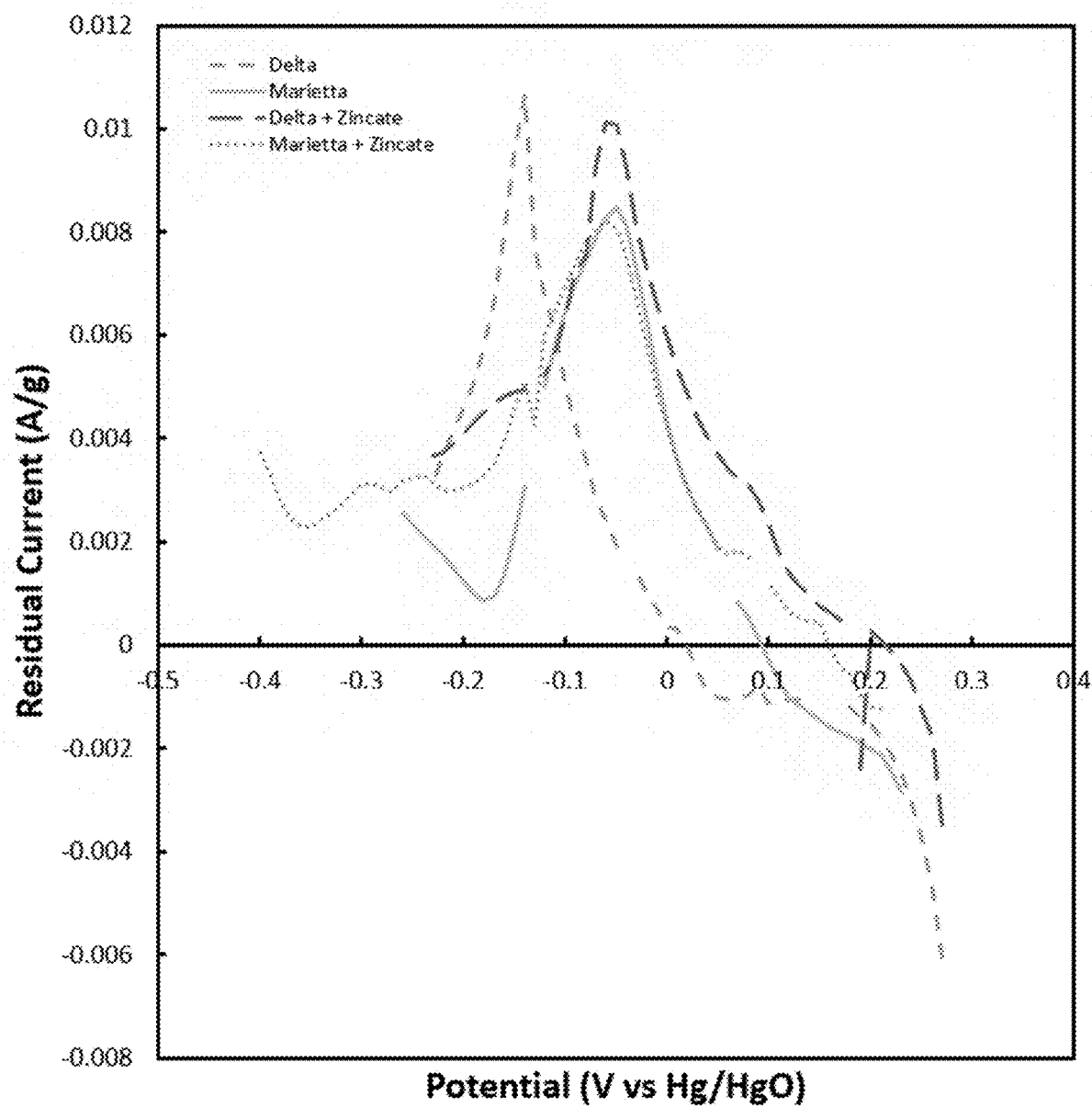

FIGS. 3A and 3B shows the SPECS fitting parameters for the diffusional fitting parameter and the residual current, respectively, for the Delta SM197 EMD and the Marietta EMD, with and without zincate. The diffusional parameter shows a decrease upon the addition of zincate in both EMDs. This is likely due to the formation of hetaerolite on the surface of the EMD impeding the diffusion of protons into the structure, probably by preventing their initial intercalation, i.e., there is a higher charge transfer resistance in materials that are saturated in zincate. This phenomenon begins immediately, indicating that as soon as Mn(III) forms on the surface of the material this is subject to attack by zincate to form hetaerolite, which could have occurred in the black mix following self-discharge. The residual currents for all samples show similar values and a similar shape. Interestingly, there is a single peak appearing at around 0 and −0.1 V in all samples other than the Delta. This sample also shows a peak, however this appears between −0.1 and −0.2 V. As mentioned above, in systems with reduced diffusion, a greater portion of the current arising from the intercalation reaction is seen in the residual current. The Delta EMD sample has the largest values for the diffusion parameter, and as such, the peak in the residual is somewhat shifted. This is corroborated by the peak appearing in the diffusional parameter of this sample at between 0 and −0.1 V.

Figure 4C:
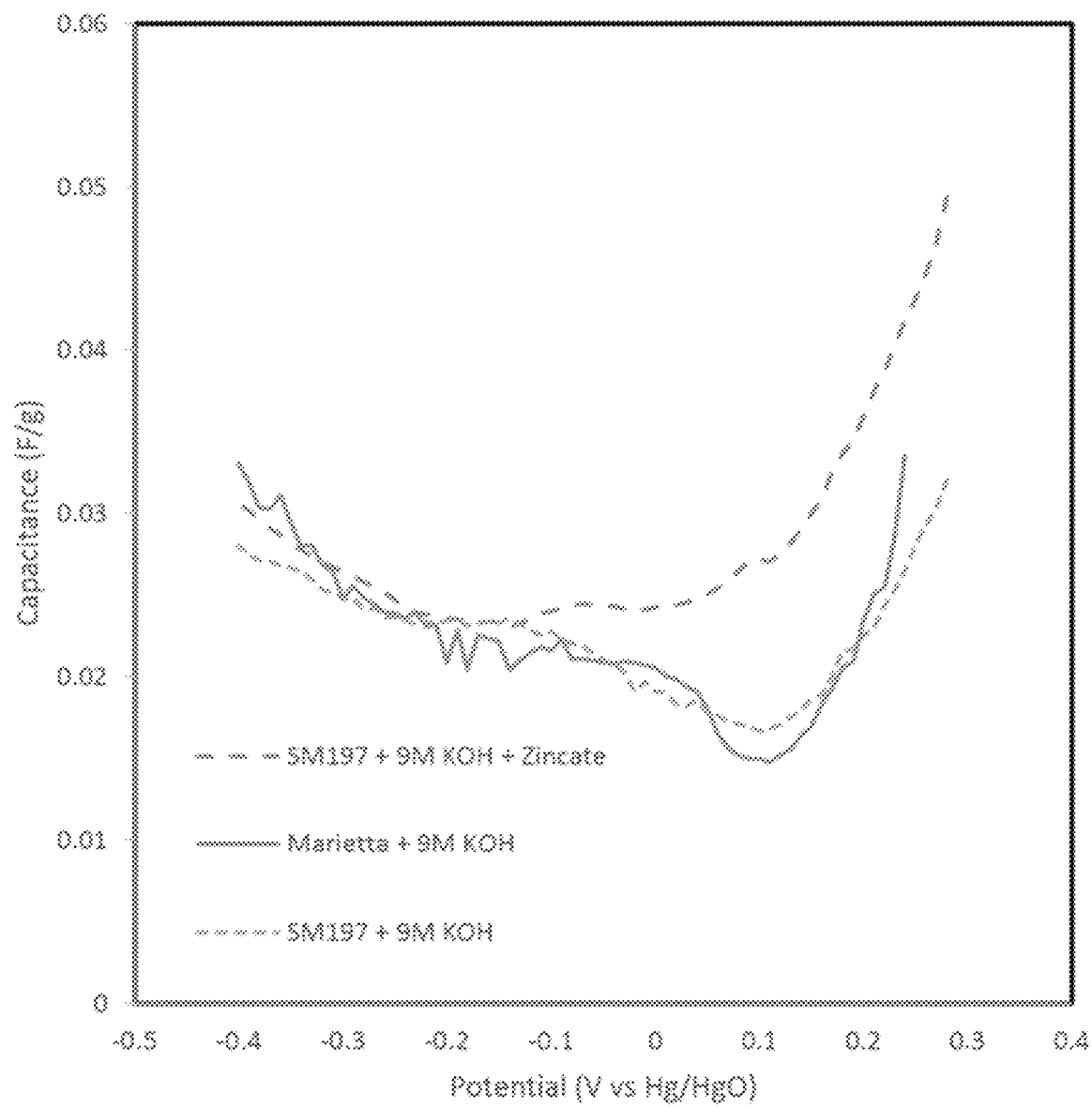

FIGS. 4A, 4B, and 4C show the series resistance, charge transfer resistance and double layer capacitance, respectively, obtained from the impedance experiments performed between the SPECS steps. These parameters all show an increase upon the addition of zincate. This correlates well with the SPECS data above, where the integration of protons into the structure was reduced upon the addition of zincate. In particular, there is a stark increase in charge transfer resistance upon the addition of zincate. This change in charge transfer resistance correlating to the decrease in diffusion parameter discussed above is further validated by the Delta EMD sample having a slightly reduced charge transfer resistance compared to the Marietta EMD, and a slightly increased diffusional parameter. Interestingly, the capacitance of the zincate containing system increases despite the increase in series resistance. This is likely due to the fate of charge at the interface. In systems where charge transfer is favored, a decrease in double layer capacitance will be seen, whereas in systems with a high resistance to charge transfer, capacitive processes are favored.

These results indicate that the presence of zincate in the electrolyte affects the charge transfer resistance of manganese oxide samples exposed to it. In particular, this is due to the formation of hetaerolite on the surface of the material during discharge from zincate contained within the electrolyte.

Notably, there was a sizeable decrease in the diffusional parameter across the whole potential range upon the addition of zincate to the solution, rather than a decrease in performance once Mn(III) is solubilized in significant quantities. This indicates that the presence of zincate inhibits charge transfer before hetaerolite is even formed. This provides evidence for the adsorption of zincate onto the surface of the material.

The effect of zincate on the discharge behavior of SM197 in the presence and absence of zincate were also studied. Results from SPECS experiments were converted to pseudo-discharge curves shown in FIG. 5.

From the investigation of the sensor electrode currents shown in FIG. 5, it can be seen that addition of zincate to the electrolyte reduces the amount of soluble Mn(III) reaching the indicator electrode. This observation, when combined with the results from the digestions and SPECS analysis on the effect of zincate, discussed above, leads to two conclusions:

First, the solubilized Mn(III) reacts with the aqueous $Zn(OH)_4^{2-}$ to form hetaerolite, preventing the Mn(III) from reaching the sensor electrode. Second, the hetaerolite thus formed coats the EMD surface, preventing the dissolution of further Mn(III).

Experiment 2: Barium Modification

The effects of adding Ba to the electrolyte on both the production of soluble Mn(III), and the proton diffusion characteristics of this thusly coated material, were studied. FIG. 6 shows the calculated discharge curves and average current on the sensor electrode from sensor electrode experiments on SM197 in an electrolyte of 9 M KOH saturated with Ba, and 9 M KOH saturated with Ba and zincate.

It appears that the addition of Ba reduces the amount of soluble Mn(III) detected at the sensor electrode when compared to those electrolytes without Ba presented above. This reduction in Mn(III) reaching the sensor electrode occurs both with and without zincate present. That is, the Ba-saturated KOH shows a reduction in Mn(III) reaching the electrolyte when compared to the blank KOH, and the Ba- and zincate-saturated KOH shows a reduction in Mn(III) reaching the electrolyte when compared with the blank zincate-saturated KOH.

Figure 7A:
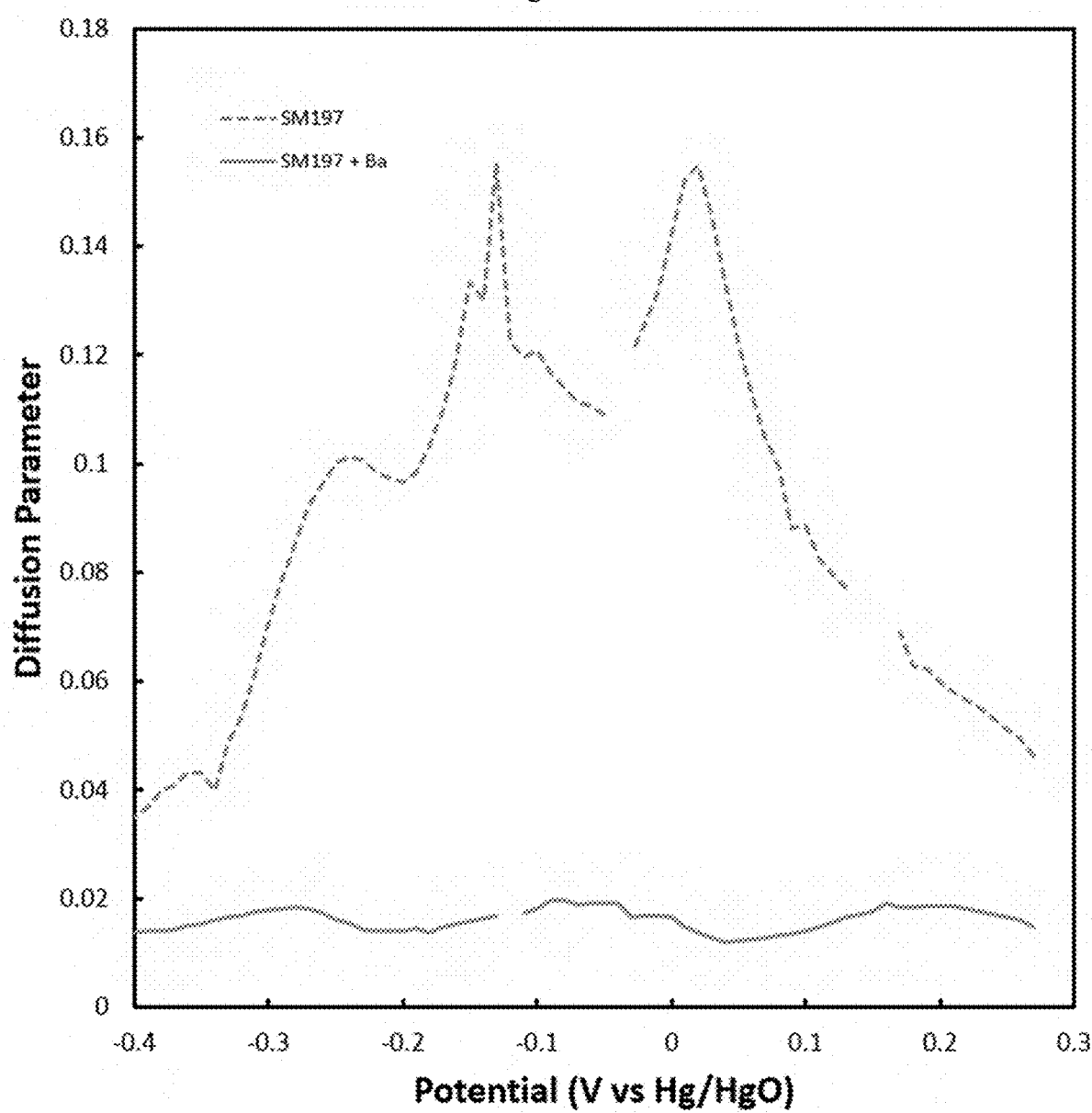
FIGS. 7A and 7B show diffusion parameters and residual currents, respectively, obtained from SPECS fitting on experiments conducted in 9 M KOH and 9 M KOH saturated with Ba.
Figure 7B:
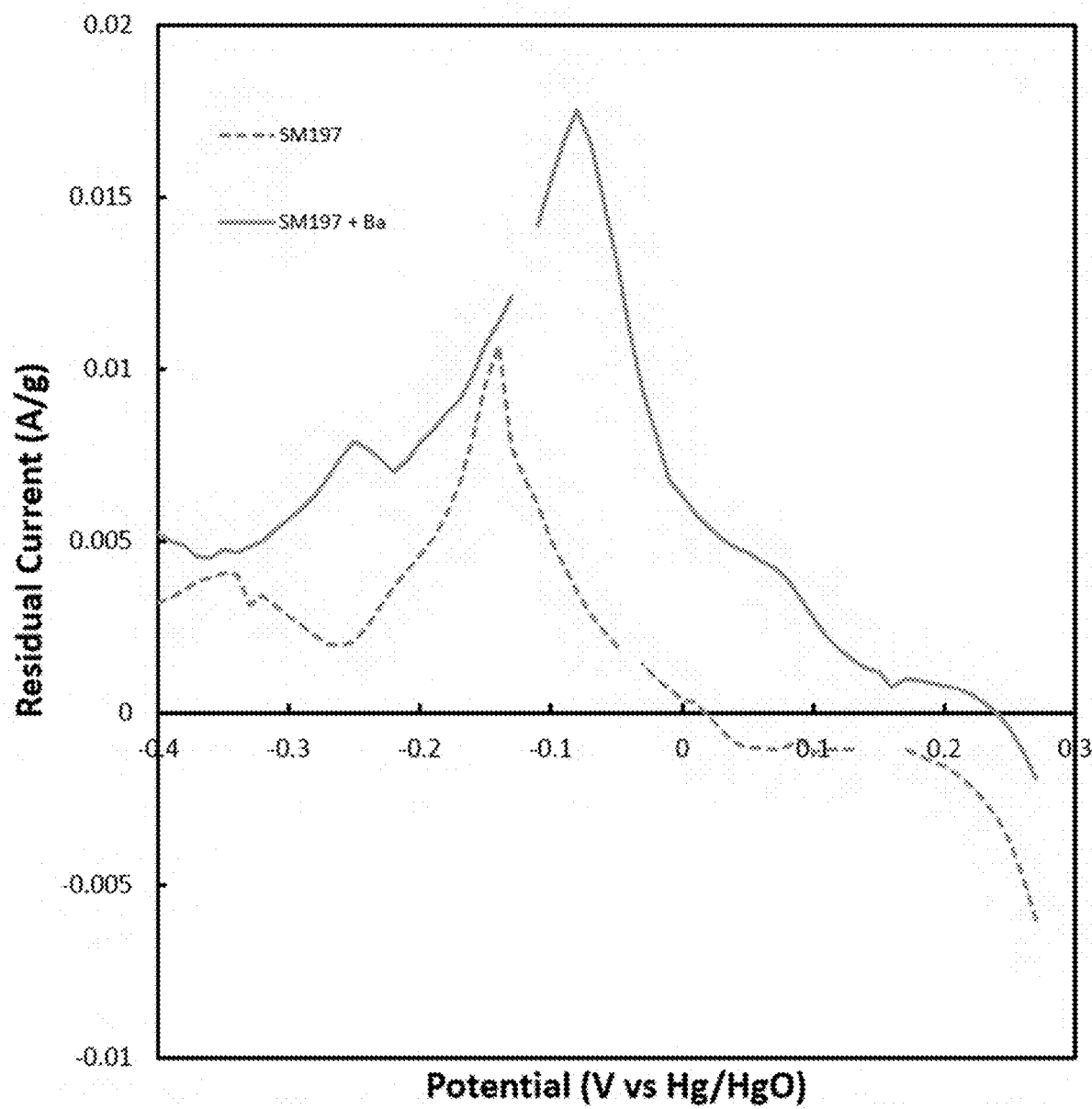
Figure 8A:
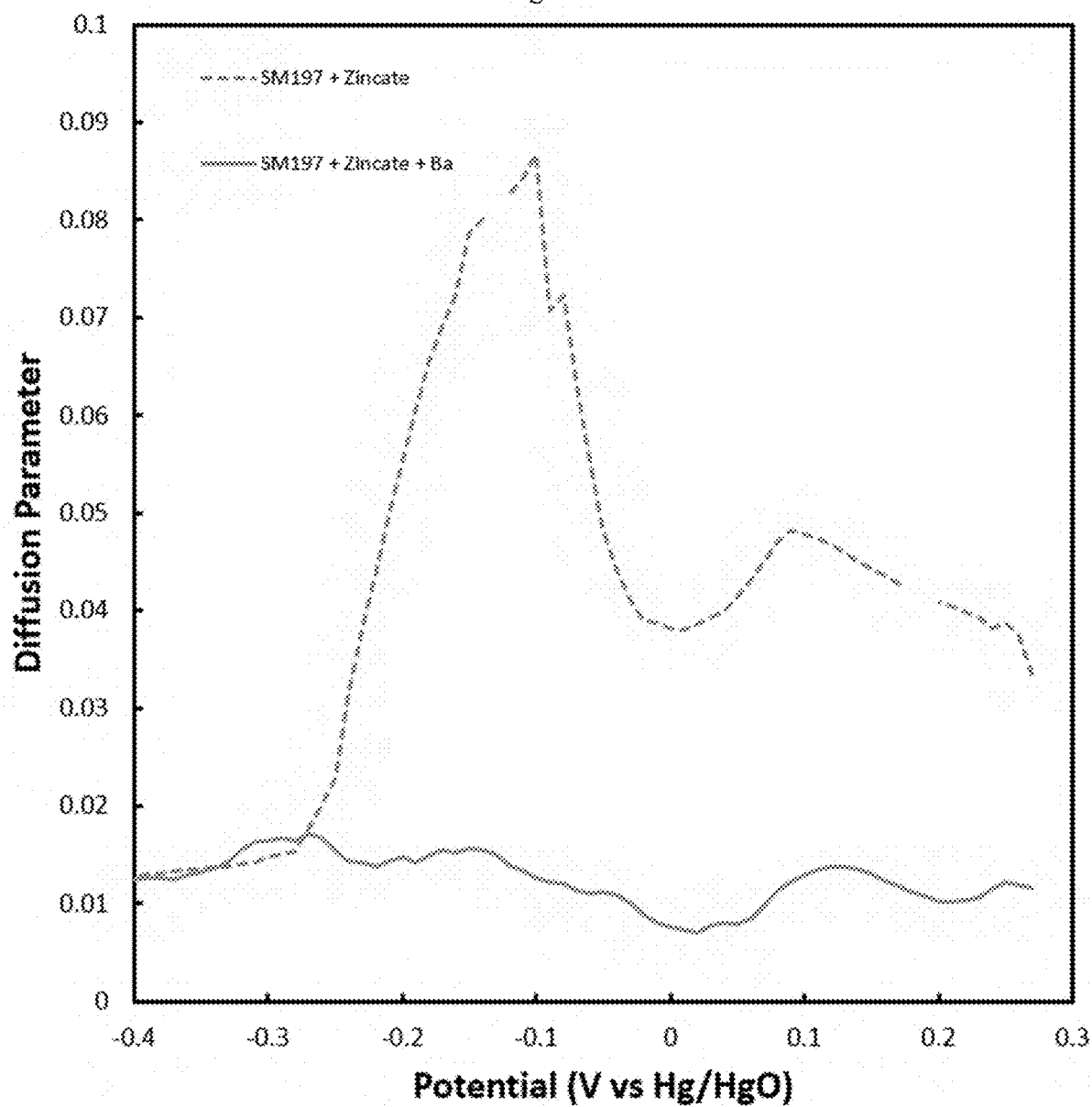

FIGS. 7A and 7B show the fitted diffusional parameter and residual currents, respectively, from SPECS/Impedance experiments on SM197 with and without a Ba-saturated electrolyte. FIGS. 8A and 8B shows the effect of Ba on the diffusional parameter and residual current, respectively, when added to an electrolyte saturated with zincate. These were conducted in electrolytes of 9 M KOH+Ba and 9 M KOH+Ba+zincate. The Ba was in the form of $BaSO_4$, which is extremely insoluble in this electrolyte. In all cases where zincate and Ba were present, these were saturated.

FIGS. 7A, 7B, 8A and 8B show that the addition of Ba into the electrolyte leads to significantly poorer diffusional characteristics. This is offset by an increase in the residual current. This is the case both with and without zincate present. As there are likely no changes to the material bulk, this indicates a high electron transfer resistance at the surface. FIGS. 9A and 9B show the diffusional and residual characteristics, respectively, of both systems in which Ba was present. These appear to be very similar, despite the addition of zincate to one. This, and the presence of an effect from the beginning of the discharge, indicate that Ba likely adsorbs to the surface of the $MnO_2$. It is likely that Ba is preferentially adsorbed at the surface as compared to zincate, given the behavior for these systems is the same. In other words, the effect of Ba is dominant. In this case, this adsorption of Ba significantly inhibits charge transfer at the interface, reducing the overall diffusional parameter of the material. Further evidence for this is in the residual current shown in FIGS. 7A, 7B, 8A and 8B, where the initial corrosion current is nearly absent in systems where Ba is present when compared to discharges performed without Ba.

These experiments provide further support for a solution-based reaction between Mn(III) and zincate. Upon the addition of zincate to the solution, the amount of Mn(III) detected at the sensor electrode was reduced. This contrasts with the lack of change seen in the diffusional/residual parameters. From this, it can be inferred that at least some of the decrease in collection is related to behavior in the solution rather than at the interface.

Experiment 3: Cerium Modification

Possible improvements through active material coating with cerium was investigated through saturating the electrolyte with Ce(IV). The Ce was in the form of $Ce(SO_4)_2$, which is very insoluble in KOH electrolyte solutions, and as such only a very small amount of Ce(IV) is used with this strategy. As with the Ba work, two solutions have been investigated; 9 M KOH+Ce and 9 M KOH+Ce+zincate. These have been compared with the zincate and barium data discussed above.

Figure 10:
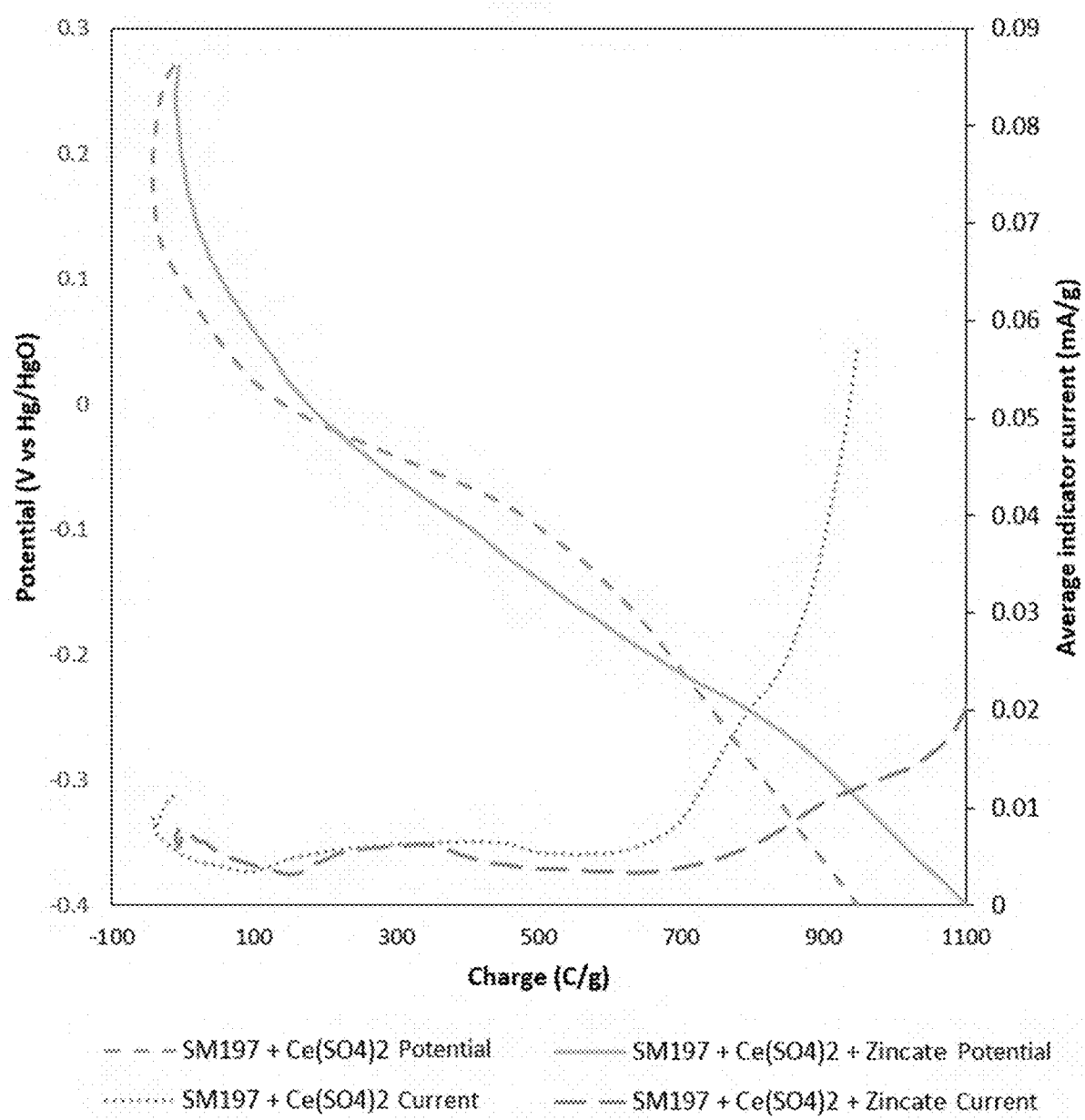
FIG. 10 shows discharge curves and sensor electrode data from SPECS analysis of Ce-saturated electrolytes.
Figure 11B:
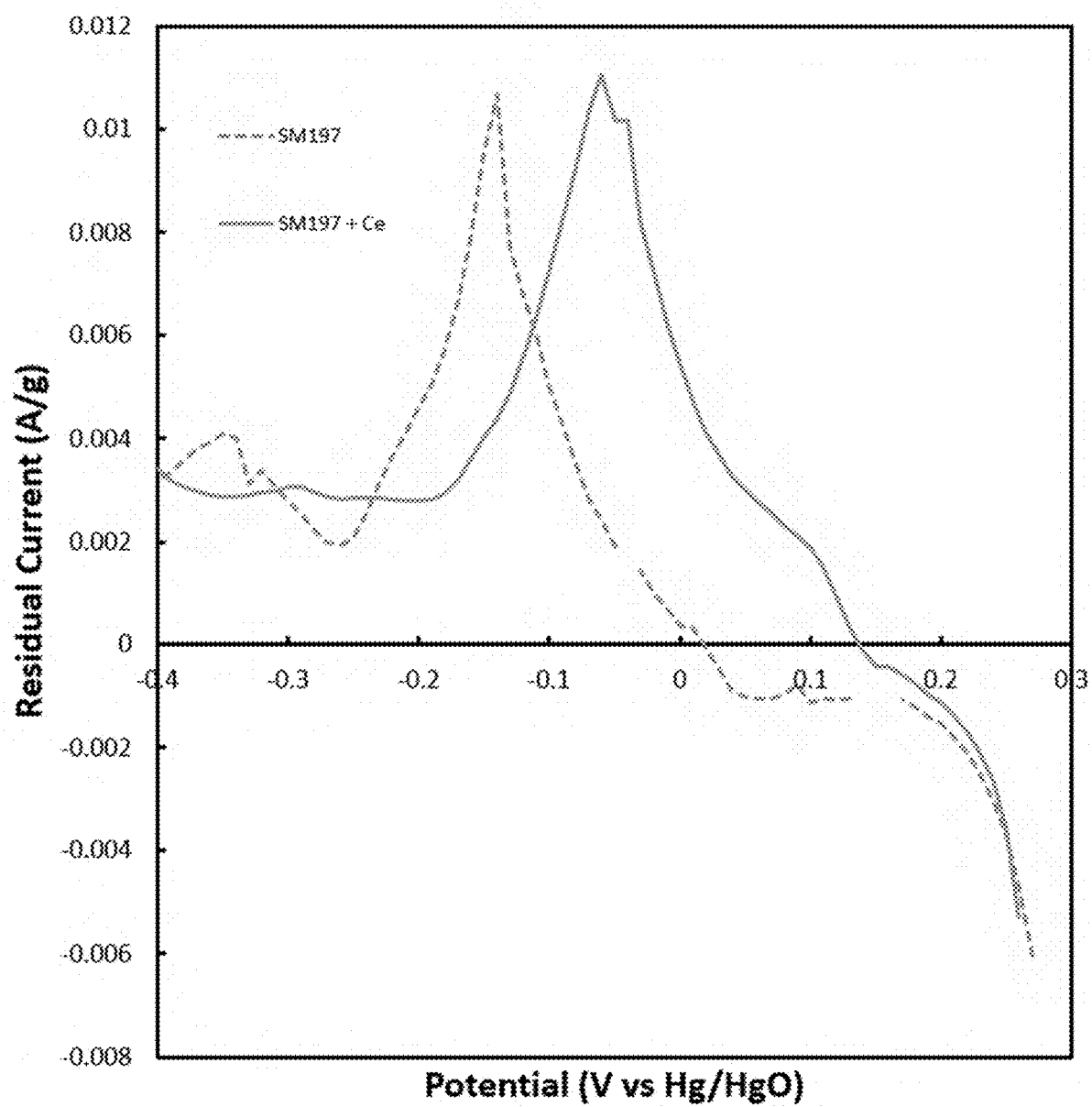
Figure 12B:
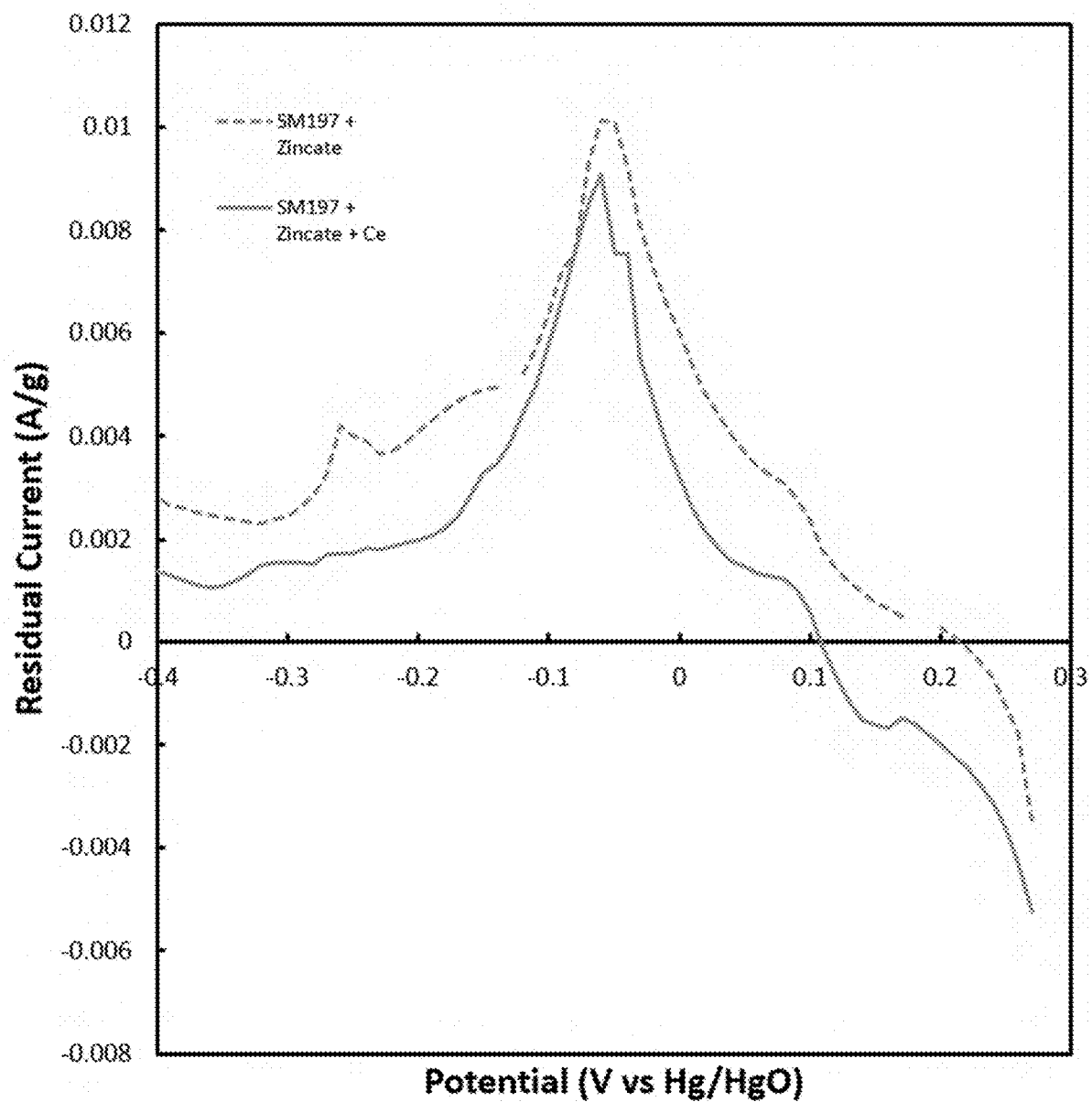
Figure 13A:
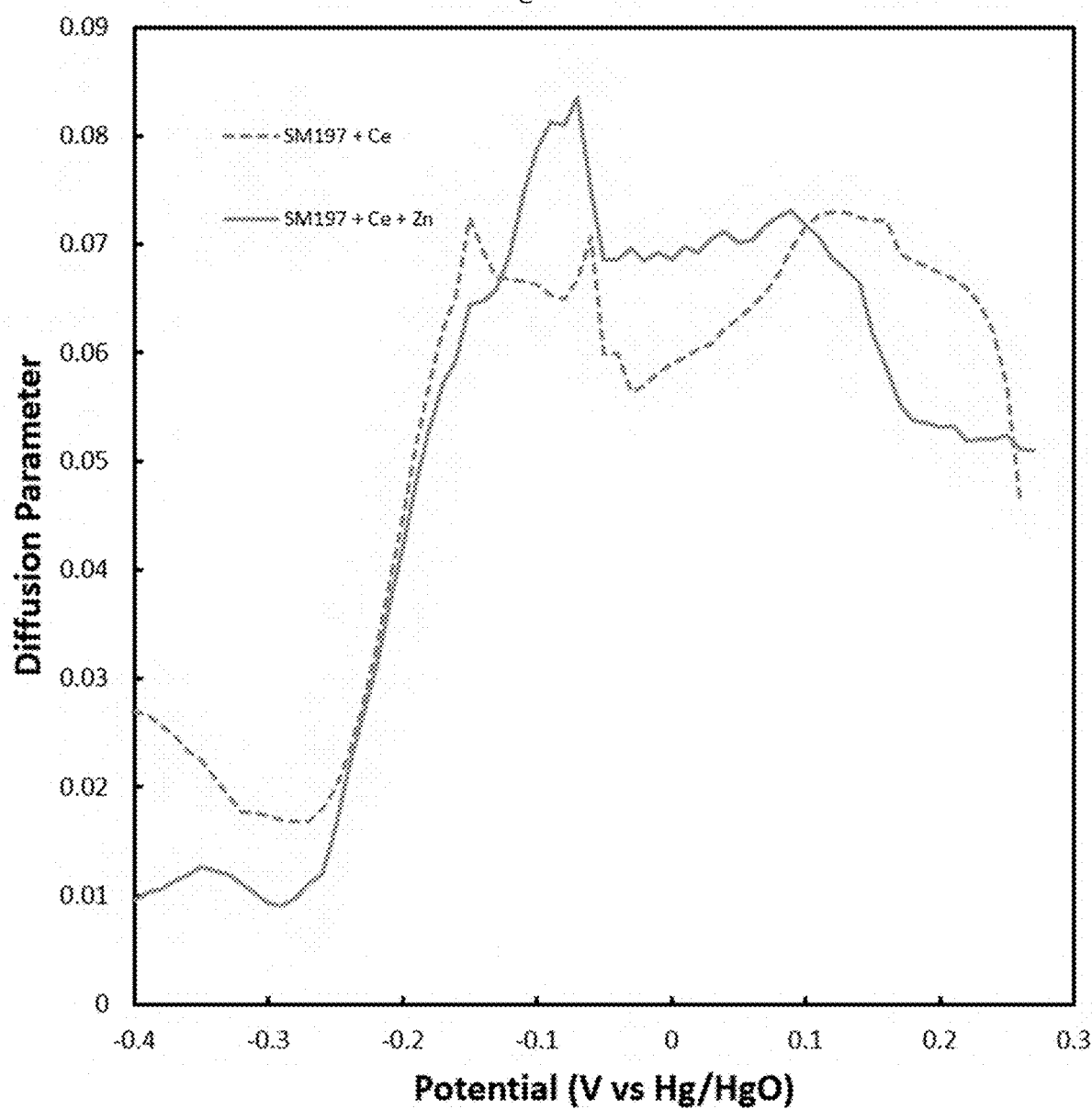

FIG. 10 shows the calculated discharge curves and average current on the sensor electrode from SPECS/sensor electrode experiments performed in the cerium-saturated solutions. As with the addition of Ba, the addition of Ce decreases the amount of solubilized Mn(III) detected at the sensor electrode. Additionally, the amount of Mn(III) detected in the zincate containing system is lower than that without zincate. FIGS. 11A and 11B show the diffusional parameter and residual current, respectively, for the zincate-free systems, i.e. 9 M KOH and 9 M KOH+Ce. FIGS. 12A and 12B show the diffusional parameter and residual current, respectively, for their zincate-saturated counterparts. FIGS. 13A and 13B show the diffusional parameter and residual current, respectively, for both Ce-saturated systems, i.e., 9 M KOH+Ce and 9 M KOH+Ce+zincate.

As with Ba, the addition of Ce to the electrolyte leads to significant changes in the discharge behavior of the system. Both the diffusion parameter and the residual current show changes in behavior and value. Again, the addition of zincate when Ce is present does not significantly change the behavior of the material as compared to a Ce-saturated electrolyte. As such, the same conclusions must apply; Ce is adsorbing to the surface, out-competing zincate, and the charge transfer regime is governed by Ce adsorption. However, in this case the adsorption of Ce leads to an improvement as compared to the adsorption of zincate. It is not yet clear why there is a significant difference in the charge transfer resistance between Ce, Ba and zincate adsorption.

For the discharge process of $MnO_2$ to occur, two key charge transfer processes must happen. That is, the insertion of an electron and the insertion of a proton. A similar set of requirements exists with regard to the corrosion current; electrons must be lost to the current collector and the newly formed Mn(VI) must dissolve in the form of $MnO_4^{2-}$. In both cases, the change in charge must precede the change in structure (dissolution of Mn(VI) or insertion of a proton). This electron transfer must occur at the three-phase boundary, whereas the other process can occur anywhere at the surface as it happens subsequently, and charge can hop through the structure. Experimentation determined that increasing the three-phase boundary increases the diffusional parameter. From this, and the experiments conducted with Ba, Ce and zincate in this work, it appears that that the facile transfer of electrons provides the driving force for diffusion of protons into the structure. The data from the zincate systems discussed above showed an increased charge transfer resistance upon addition of zincate, which is consistent with these conclusions.

Figure 14B:
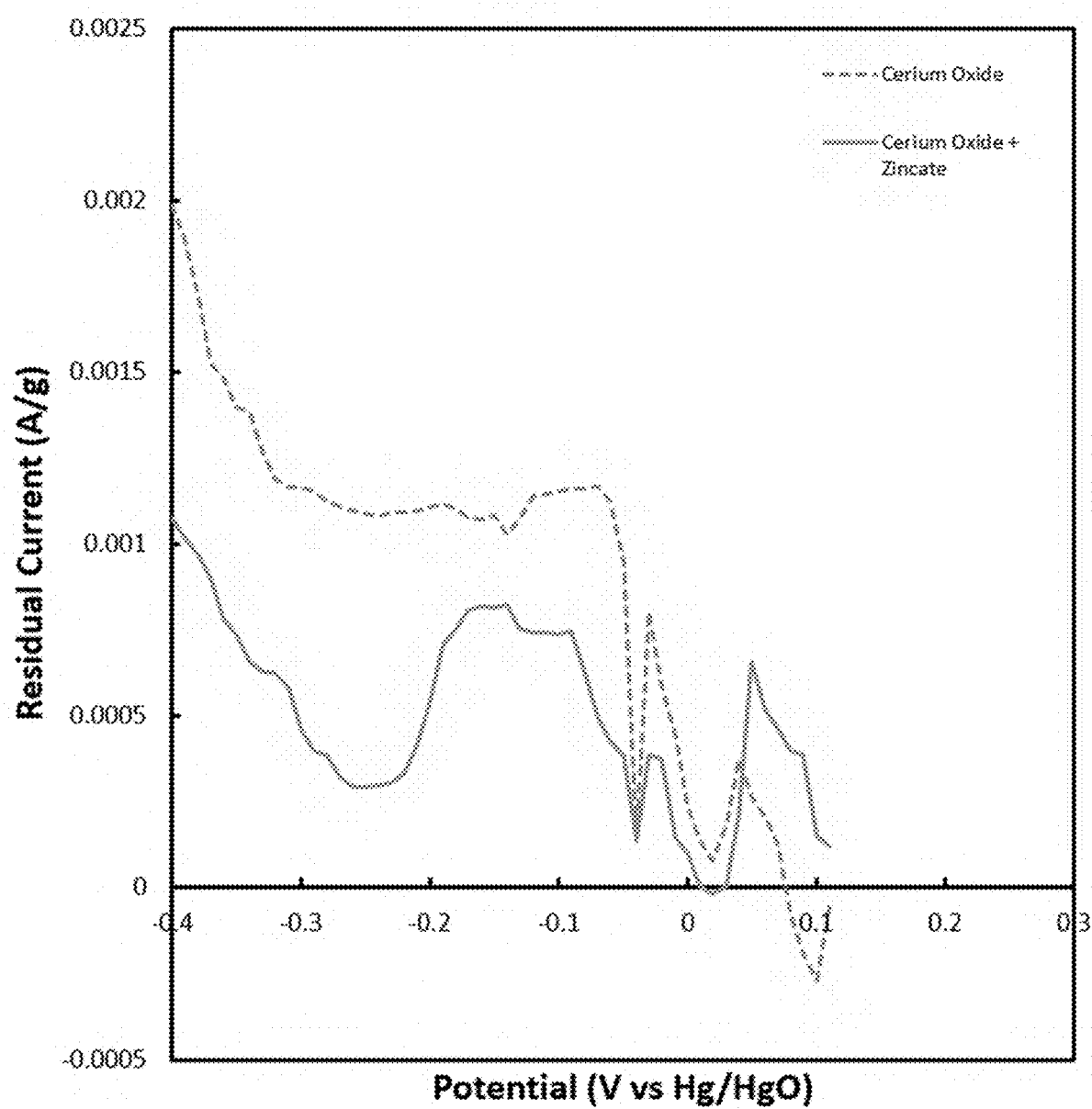

As $CeO_2$ can undergo reduction in the solid state, it is possible to investigate its discharge behavior. This allows determination of whether the change in discharge behavior upon the addition of Ce to the electrolyte is related to the integration of $CeO_2$ into an oxide framework on the surface, or simple adsorption of these ions changing the charge transfer properties. As such, SPECS/impedance experiments were performed on $CeO_2$ and fitted this to determine its parameters. The $CeO_2$ used had an average particle size of <5 μm as this was purchased for electrolyte modification. These discharges were conducted in 9 M KOH and 9 M KOH saturated with zincate. FIGS. 14A and 14B show the diffusional parameter and residual current, respectively, obtained from these. The values seen for both the diffusional parameter and the residual current are significantly different than the results seen for SM197 discharged in a Ce(IV) saturated electrolyte. Further, the open circuit value of the material was low (110 mV). As such, it is inferable that the change in behavior is likely related to the adsorption of Ce(IV) ions onto the surface of the EMD, rather than the formation of a thin layer of $CeO_2$ on the surface. This is an interesting result, as it indicates that the use of adsorbents that out-compete zincate and lead to reduced charge transfer resistance could be a successful material improvement strategy. As additional evidence for this theory, $CeO_2$ showed significant differences in both the diffusional and residual parameters upon the addition of zincate. This provides further evidence for the theory of zincate adsorption hindering charge transfer behavior. Additionally, because this significant difference is not seen in a Ce(IV) saturated electrolyte, this provides additional evidence for Ce(IV) adsorbing to the surface of the EMD rather than integrating into the oxide framework.

Additional experimentation was performed using $Ce(SO_4)_2$-saturated half-cells. An approximately 30 g mix was made of 82.6% EMD, 13.8% graphite (GA-17), 0.65% coathylene binder and 3% KOH solution (45%). About 0.072 g of the mix was pressed into a Ni mesh under 25,000 lbs of force, and the sample was weighed to determine the exact EMD mass.

Figure 15:
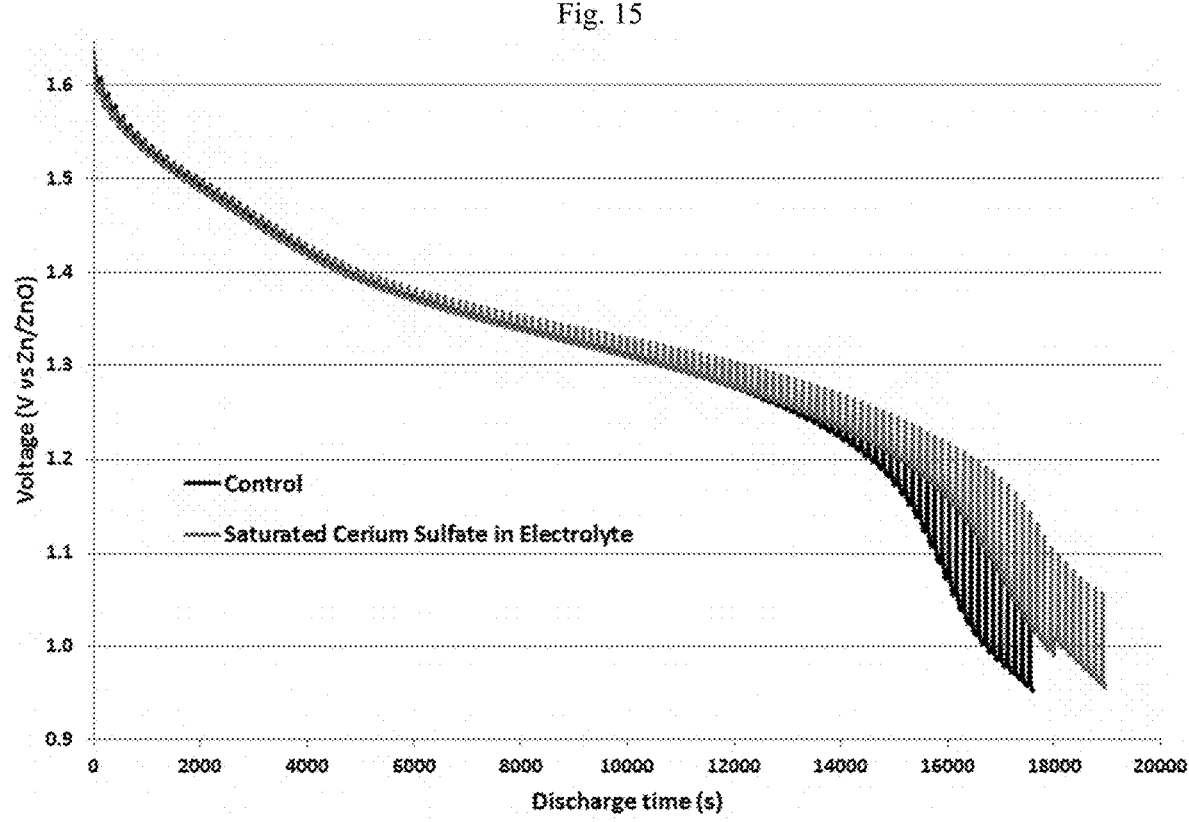
FIGS. 15 and 16 show discharge data from cerium sulfate half-cells, compared to control half cells.
Figure 16:
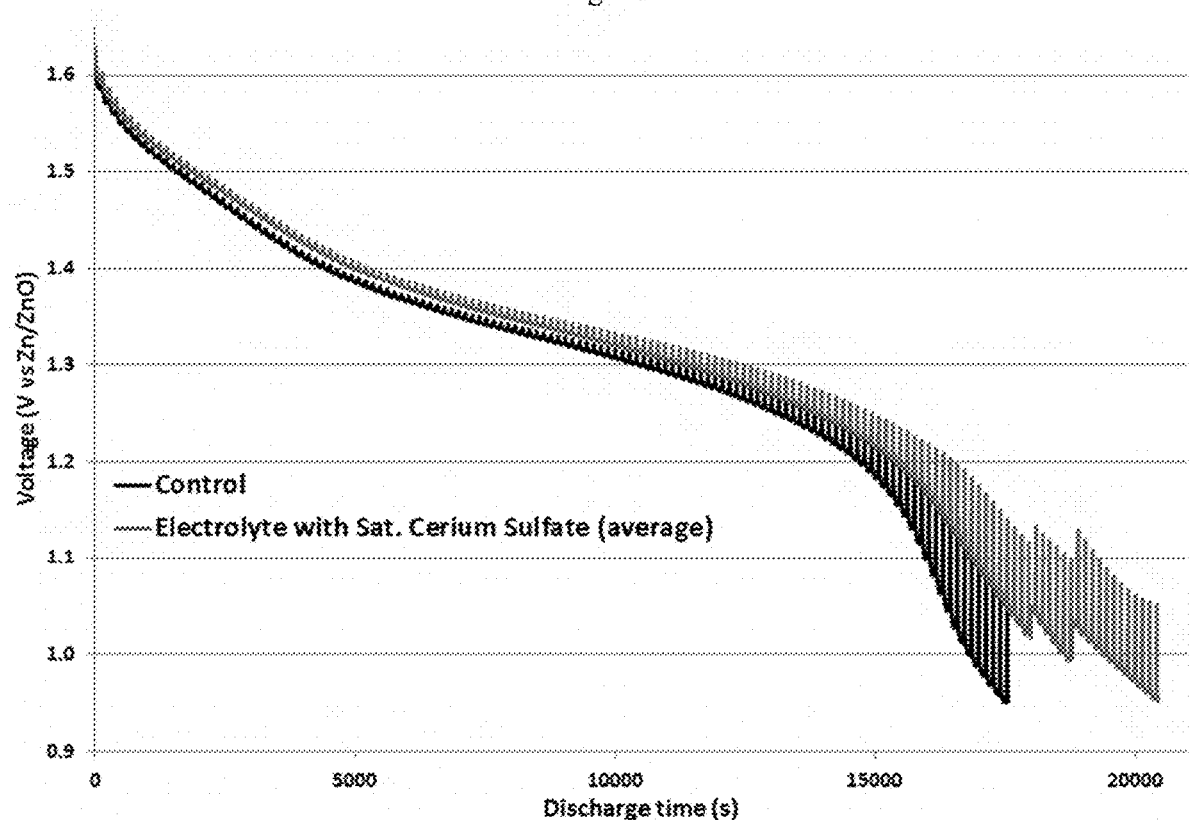

Discharge occurred in a flooded half-cell vs a Ni counter electrode with a Zn/ZnO reference electrode. The electrolyte was either 40% KOH with 6% ZnO, or 40% KOH with 6% ZnO saturated with $Ce(SO_4)_2$. Cerium sulfate samples were run in triplicate and averaged; this experiment was run twice. The cells were discharged at a current of 100 mA/g of EMD with intermittent current interrupts (5 s rest after every 1 min of discharge) to a final voltage of 0.9 V vs Zn/ZnO. Results are shown in FIGS. 15 and 16.

Full cells were also tested. Ring molded cathodes were fabricated from 10.3 g of EMD and 0.45 g of graphite with 0.42 g of KOH solution and 0.22 g of binder and other additives. After insertion of separator paper, a first shot of electrolyte (1.36 g) was added. This electrolyte was either 36.5% KOH or 36.5% KOH saturated with $Ce(SO_4)_2$. After this first shot, anode of 4.415 g Zn, 0.028 g gelling agent, 1.841 g 28% KOH solution, 0.018 g ZnO, 0.007 g sodium silicate and 0.009 g dispersant was added into the cell, which was then finished and closed.

After 4 weeks of aging, 10 cells of each type were discharged at 50 mA (1 h on/1 h off), to a 0.9 V cut. Due to an instrument error, data for only 9 of the cells without cerium sulfate was recorded. FIG. 17 shows the data from the full cell experiments, which is the average of the 9 or 10 cells in each lot.

Figure 18B:
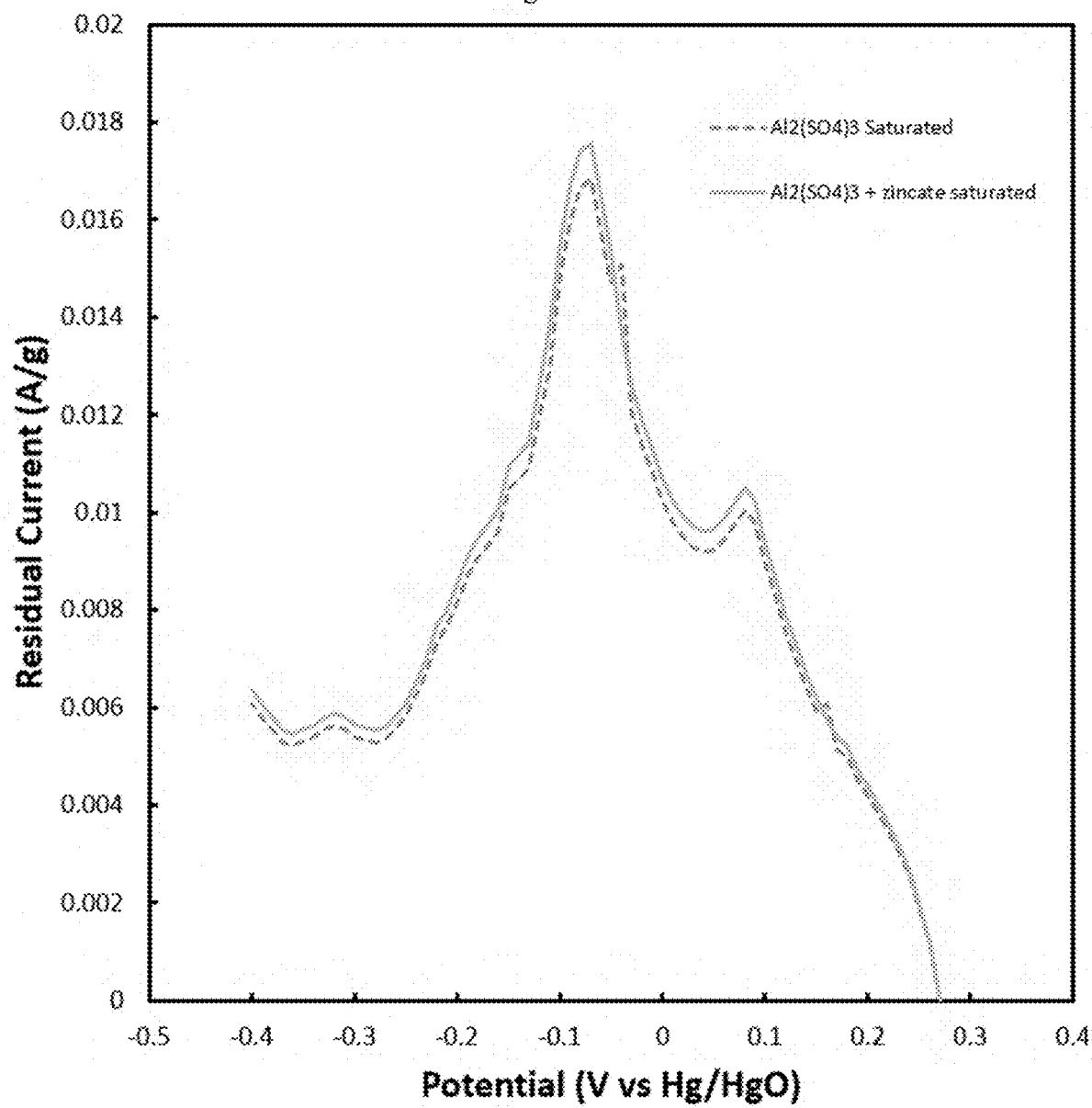

Experiment 4: Aluminum Modification $Al_2(SO_4)_3$ as an electrolyte additive was also tested. FIGS. 18A and 18B show the diffusion parameter and residual current, respectively, obtained from the SPECS discharge of Delta SM197 in electrolytes of 9 M KOH saturated with $Al_2(SO_4)_3$ and $Al_2(SO_4)_3$+zincate. When compared with other discharges lacking $Al_2(SO_4)_3$, these results show that the addition of $Al_2(SO_4)_3$ significantly decreases the diffusional parameter when compared to Delta SM197, discharged with and without zincate present.

Experiment 5: Magnesium and Copper Modification

Figure 19A:
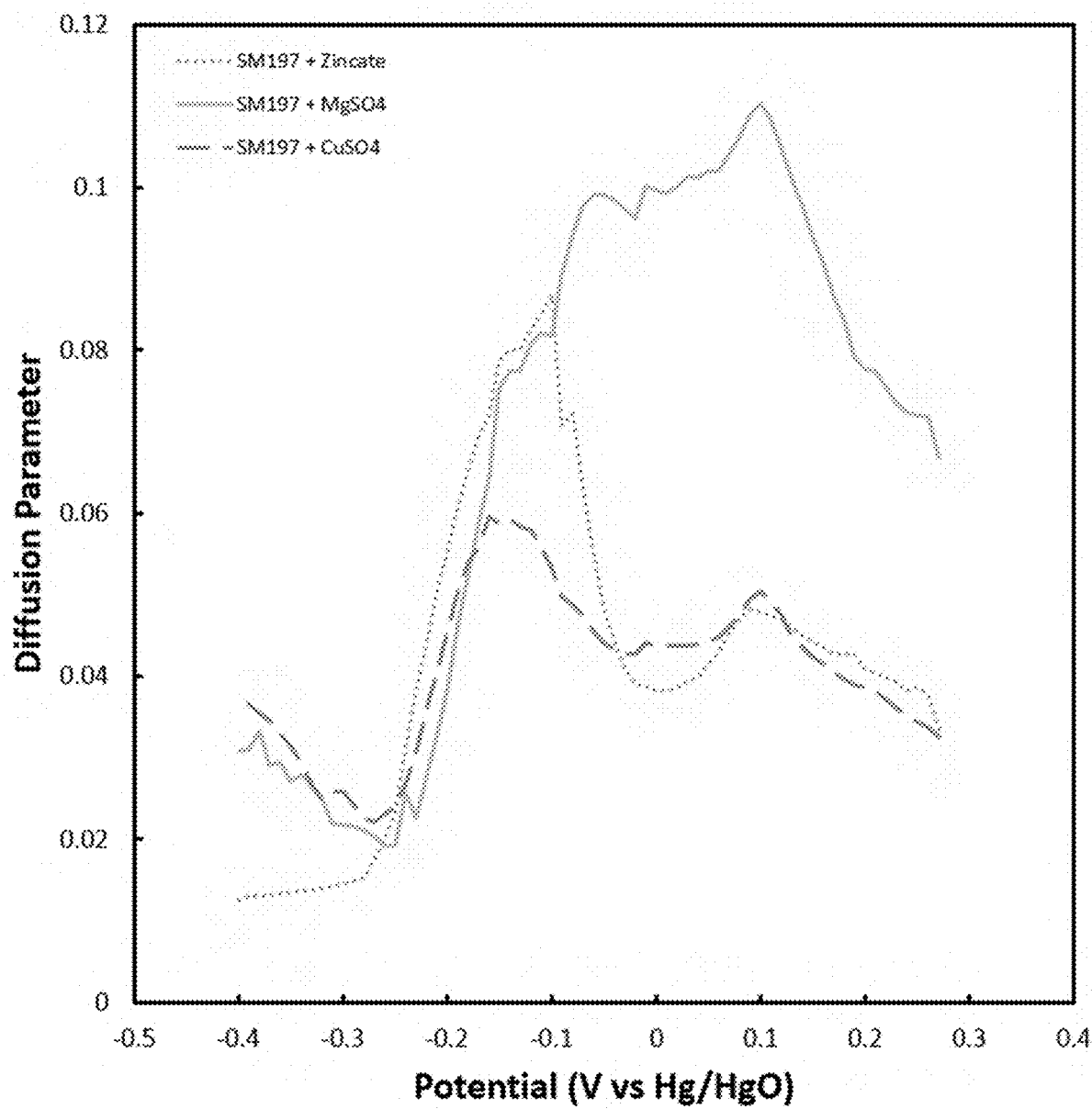

Similar experiments were performed to examine Mg(II) and Cu(II) ions in solution, using the metal salts $MgSO_4$ and $CuSO_4$, respectively. The diffusion parameters and residual current obtained from SPECS fitting on these systems are shown in FIGS. 19A and 19B, respectively, along with the data obtained from a discharge in a solution saturated with zincate for comparison. The material used was standard Delta SM197. The addition of $Mg^{2+}$ leads to a diffusional performance greater than zincate across the entire potential range. Further, $Cu^{2+}$ appears to show a regime like that seen with zincate. Neither the $Cu^{2+}$- or $Mg^{2+}$-saturated electrolytes contained zincate.

Experiment 6: Additional Metal Oxide Salt Modification

More metal oxide salt adsorbents were tested in the cathode compartment of the alkaline manganese dioxide batteries. This also included testing the blank cathode, containing zinc oxide only, as a control.

A blank cathode was prepared by using saturated zinc oxide (ZnO) in 9 M KOH solution in the cathode structure and electrolyte. Since this cathode did not contain any other metal oxides, it is considered a control cathode and its performance is used as a reference for comparing the performances of other cathodes with adsorbents.

Saturated solutions of all adsorbents were prepared by adding excess amount of metal oxide salts to 9 M KOH pre-saturated with zinc oxide. Performance of the cathode in the presence of each adsorbent (saturated in 9 M KOH) was evaluated through results obtained from step potential electrochemical spectroscopy (SPECS).

Cathodes with $CeO_2$, $SnO_2$, CoO, and $Bi_2O_3$ as adsorbents (group A adsorbents) showed relatively higher diffusion parameters.

Figure 20A:
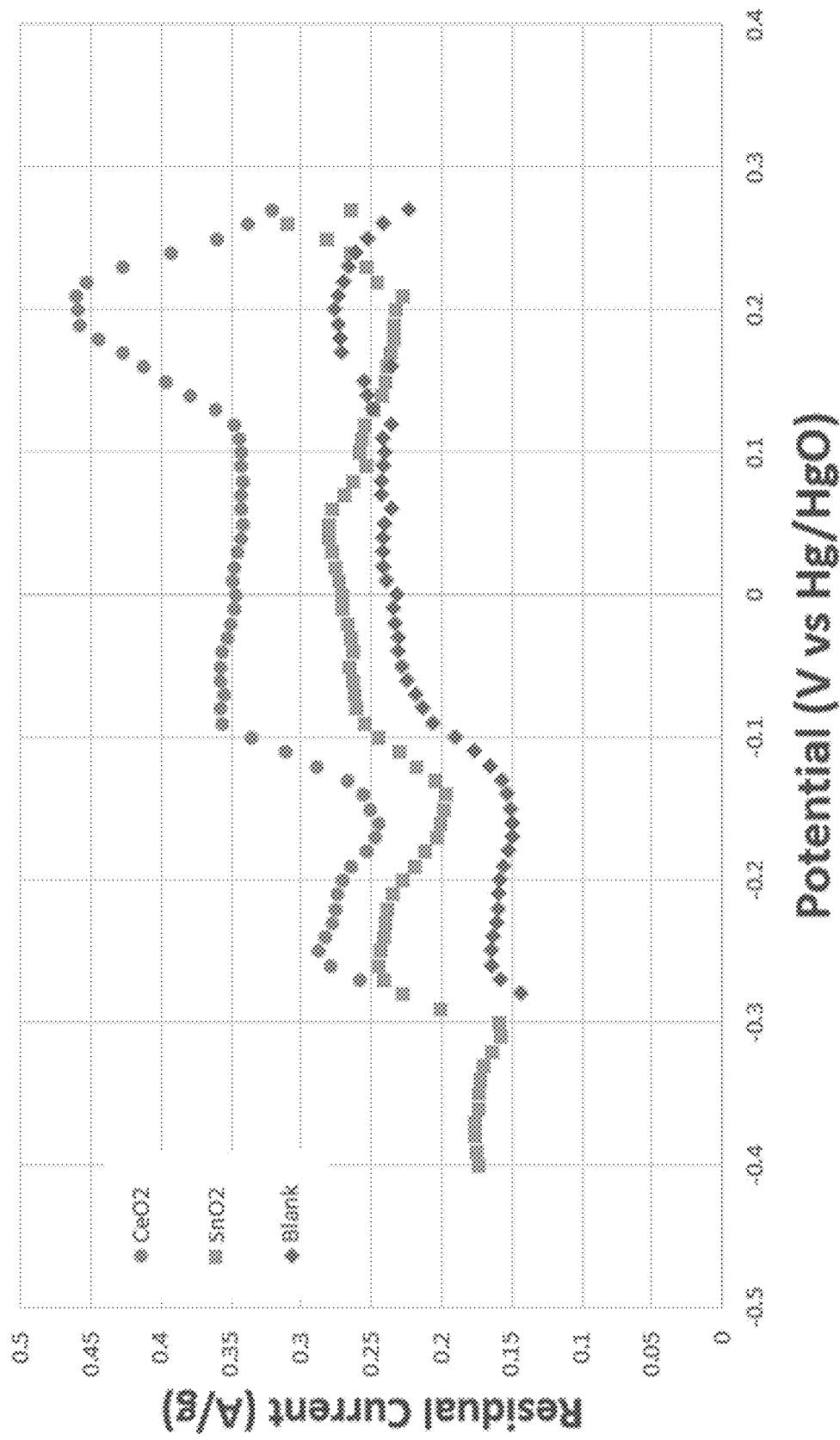
FIGS. 20A and 20B show full, normalized currents from SPECS analysis of electrolytes saturated with Ce, Sn, Co, and Bi at different time points.
Figure 20B:
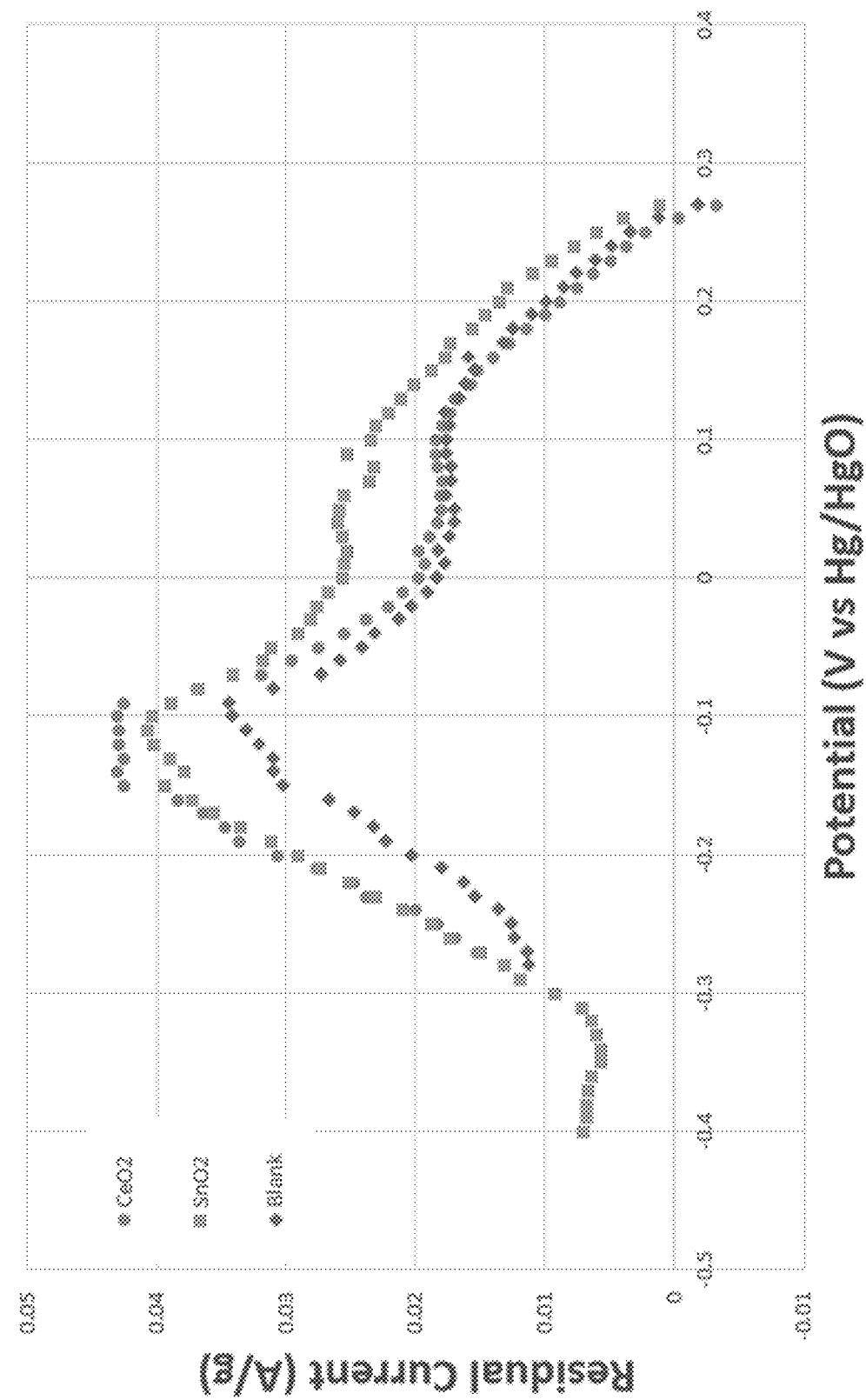

FIGS. 20A and 20B illustrate full, normalized currents for cathodes with the above-mentioned adsorbents at two different collection times (1 second and 20 seconds, respectively) and at each potential step.

At 1 second, cathodes with $CeO_2$ and $SnO_2$ show higher normalized current than the control cathode and cathodes with other additives in this group, for almost the entire measured potential range. There is a peak in current with maximum around 0.2 V for $CeO_2$ and the control cathodes but slightly at higher potential (around 0.25 V) for $SnO_2$ and $Bi_2O_3$ cathodes. This peak is more significant for $CeO_2$, $SnO_2$, and $Bi_2O_3$ compared to the control cathode. There is a decline in current around −0.1 V for all cathodes. Finally, there is another broad peak in current for all cathodes which happens between −0.15 and −0.3 V. It looks as there are two peaks with two maximums associated with this broad peak; one maximum at −0.2 V and the other at around −0.25 V.

At 20 seconds, the maximum current for all cathodes happens between −0.1 and −0.15 V. This current peak is relatively broad and it seems as there are at least two peaks associated with this maximum; one at −0.1 V and the other at −0.15 V.

Figure 21:
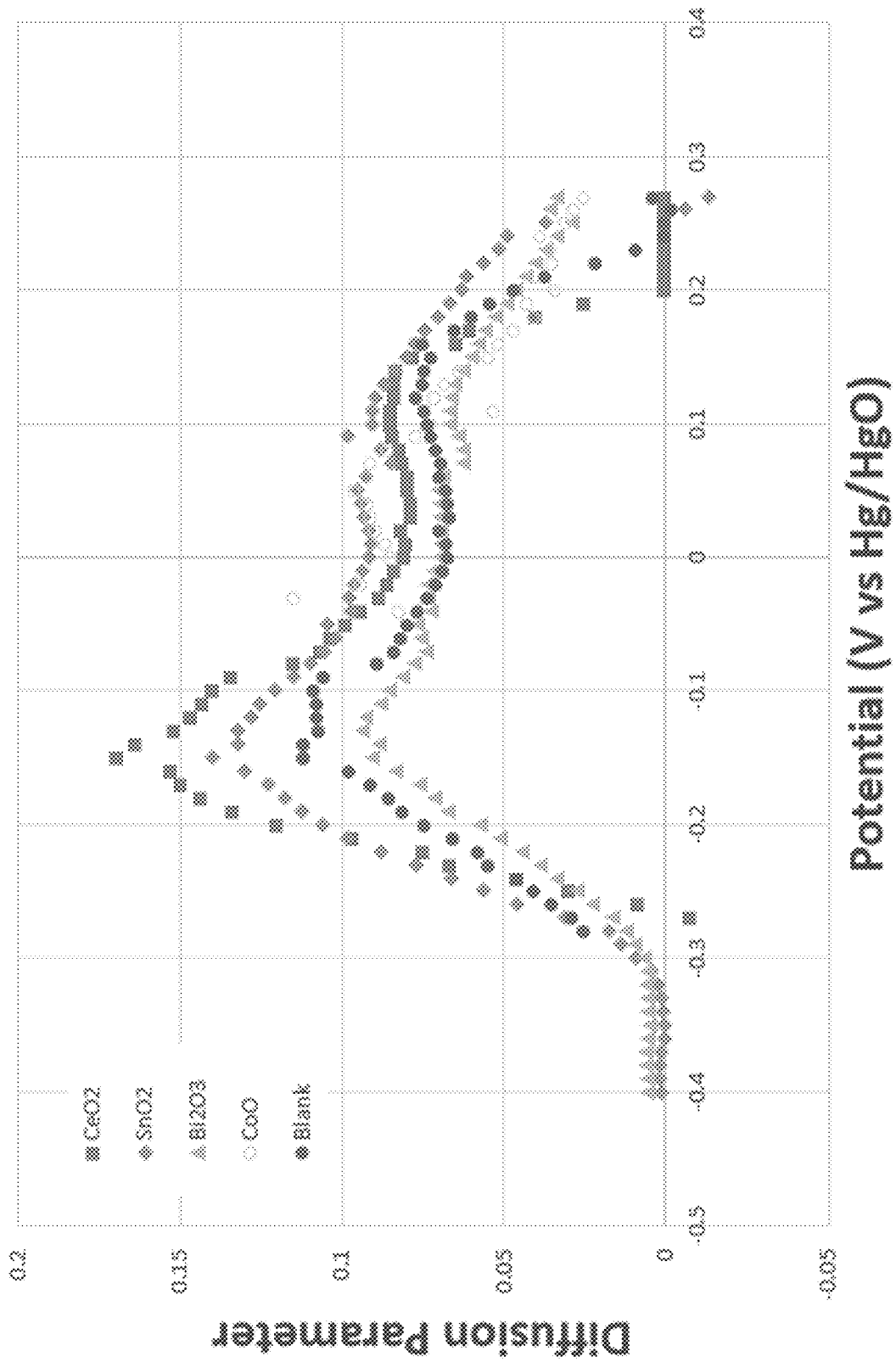
FIG. 21 shows diffusional parameters from SPECS analysis of electrolytes saturated with Ce, Sn, Co, and Bi.

Among these cathodes, $CeO_2$, $SnO_2$, and CoO showed diffusion parameters higher than or similar to diffusion parameter of the control cathode over the scanned potential range (from 0.28 to −0.40 V vs Hg/HgO). See diffusion parameter plot in FIG. 21. In particular, the cathodes with $CeO_2$ and $SnO_2$ adsorbents showed higher diffusional parameter (B) compared to cathodes with the other adsorbents in almost entire measured potential range.

Experiment 7: Concentration Effects

Figure 22:
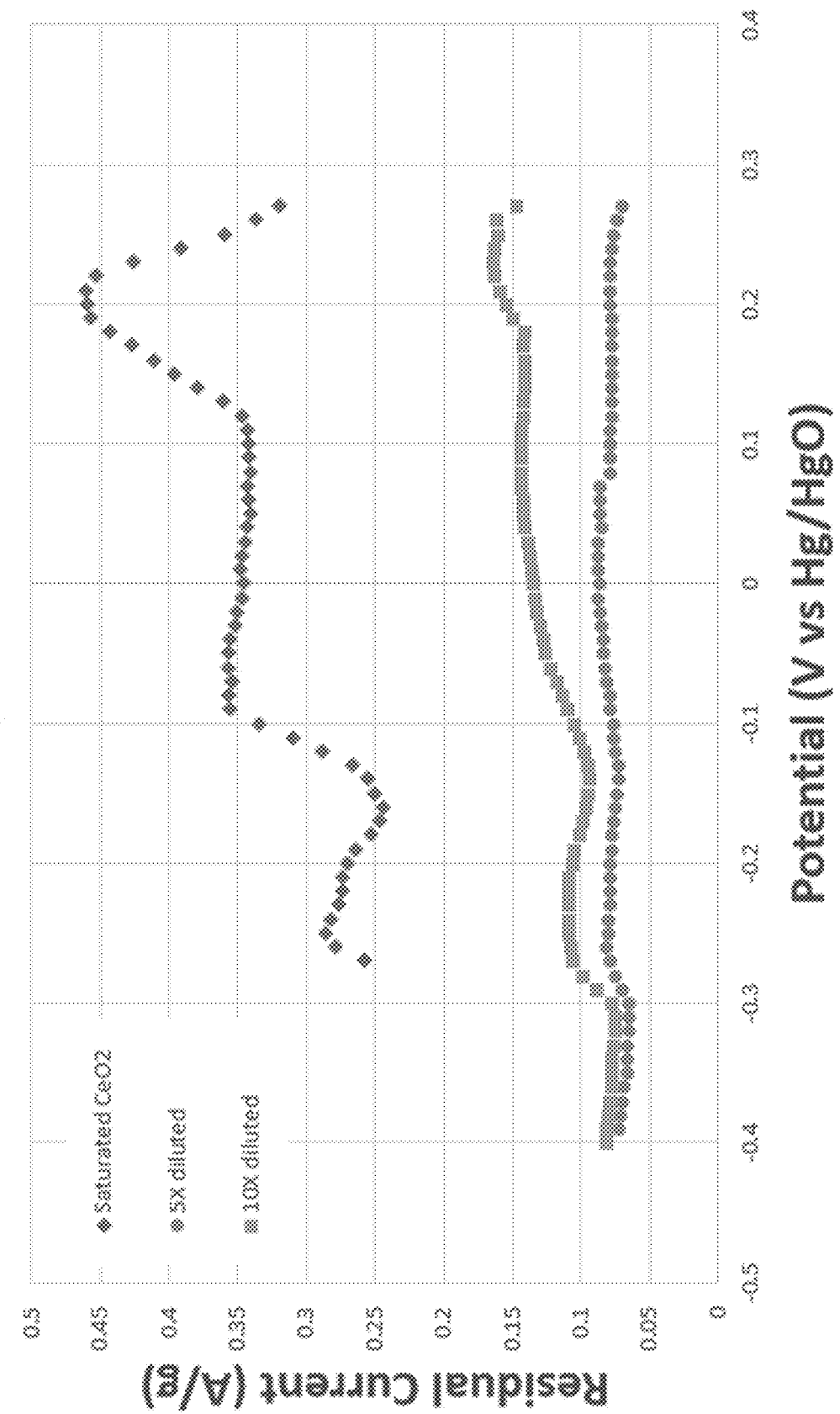
FIG. 22 shows the effect of different concentrations of Ce on full, normalized current.

The effect of concentration of the adsorbent on cathode performance was studied by using different concentrations of $CeO_2$ in the electrolyte, as well as in the cathode structure. Saturated solution of cerium oxide was prepared in 9 M KOH pre-saturated with zinc oxide. This solution was diluted five- and ten-times using 9 M KOH pre-saturated with zinc oxide (meaning that zinc oxide concentration in the saturated and diluted solutions of the cerium oxide is the same). The full, normalized currents at an early state of discharge (at 1 second) are shown in FIG. 22. Saturated cerium oxide electrolyte demonstrates superior performance compared to the diluted solutions.

Experiment 8: Ruthenium Modification

Figure 23A:
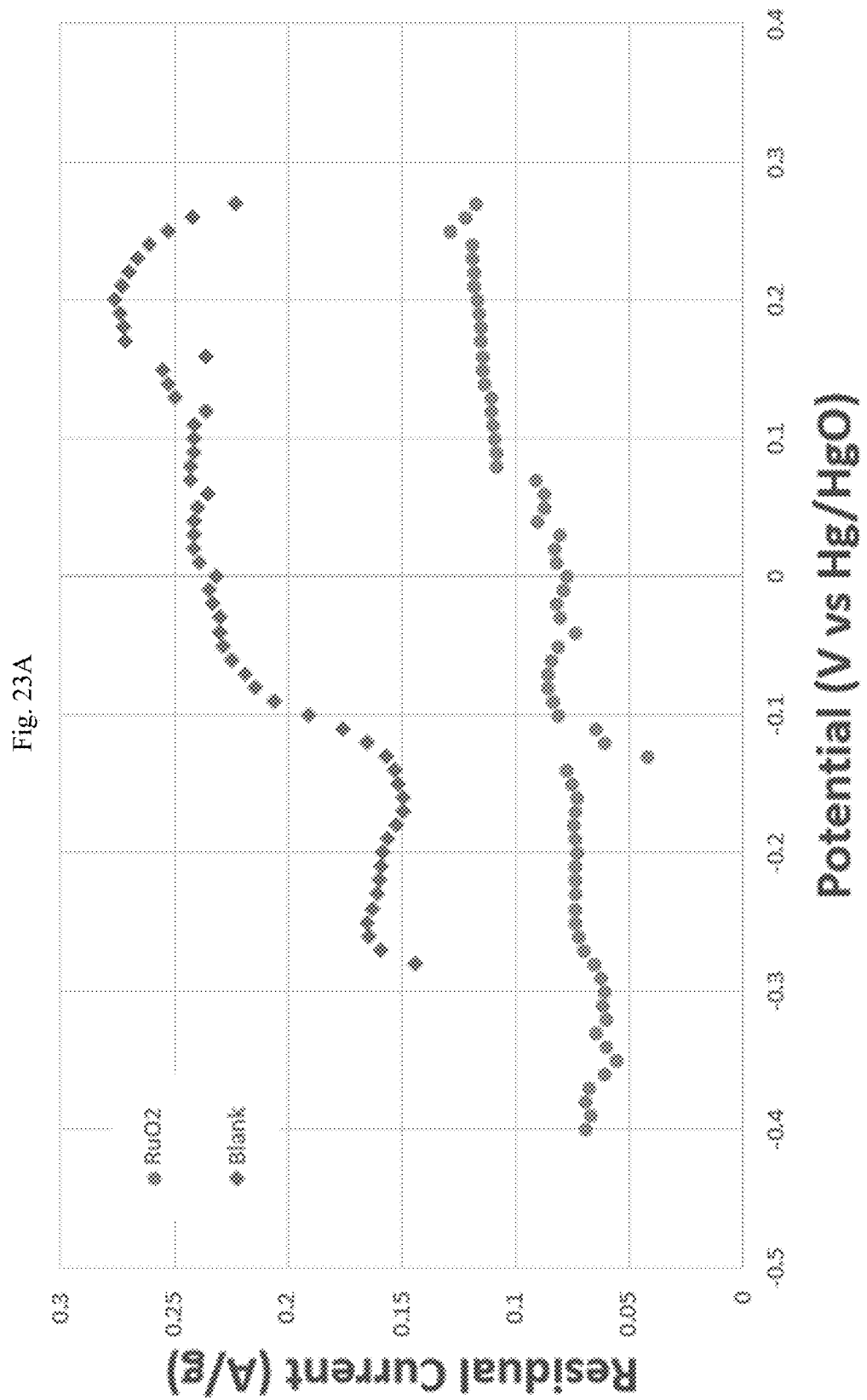
FIGS. 23A and 23B show full, normalized current from SPECS analysis of Ru-saturated electrolytes at different time points.
Figure 23B:
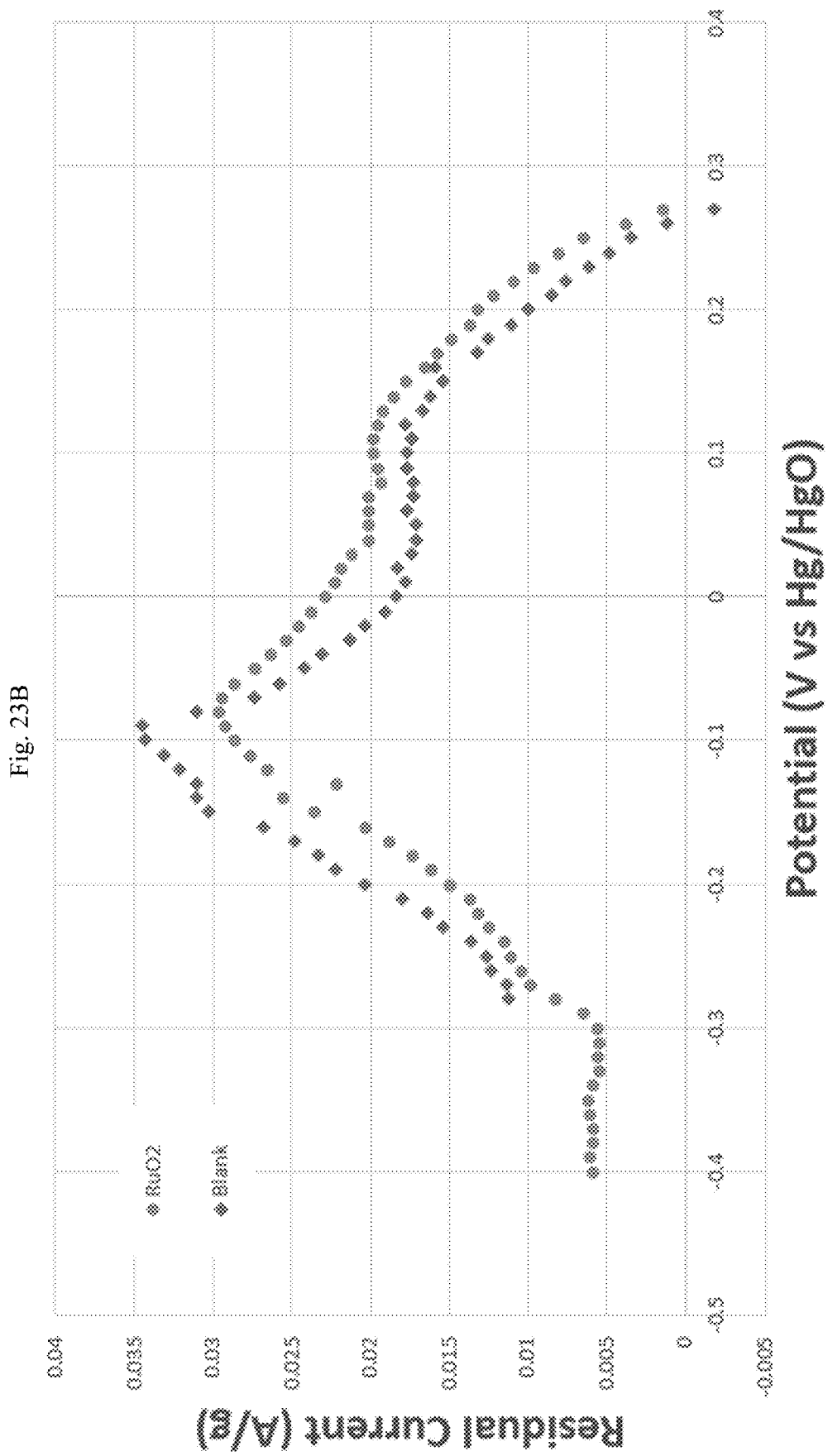

Testing similar to that described in Experiment 6 was performed using $RuO_2$. Similar to previously tested adsorbents, a saturated solution of $RuO_2$ was prepared by adding excess amount of metal oxide salts to 9 M KOH pre-saturated with zinc oxide. Performance of the cathode in the presence of the adsorbent (saturated electrolyte) was evaluated through results obtained from step potential electrochemical spectroscopy (SPECS). FIGS. 23A and 23B illustrate full, normalized currents for cathodes with $RuO_2$ at two different collection times (1 second and 20 seconds, respectively) and at each potential step, compared to a control. Notably, while the ruthenium cathode did not exhibit improved performance at 1 second, compared to the control, it exhibited increased current for a significant range of potentials at 20 seconds.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments.

What is claimed is:

1. An alkaline electrochemical cell, comprising:
   a) a container; and
   b) an electrode assembly disposed within the container and comprising a cathode, an anode, a separator located between the cathode and the anode, and an alkaline electrolyte solution; and
   wherein the cathode comprises an active material comprising manganese dioxide;

and the cathode comprises a Ce ion adsorbed on its surface; and wherein the anode comprises an active material comprising zinc.

2. The alkaline electrochemical cell of claim 1, wherein the electrolyte solution comprises a cerium additive in a concentration of 0.0001-1 M, said cerium additive being
   a) a cerium salt, wherein the cerium salt additive is a cerium sulfate salt, a cerium carbonate salt, a cerium chlorate salt, a cerium hydroxide salt, a cerium cyanide salt, a cerium cyanate salt, a cerium thiocyanate salt, a cerium nitrate salt, a cerium phosphate salt, or a cerium dichromate salt; or
   b) a cerium oxide.

3. The alkaline electrochemical cell of claim 2, wherein the cerium additive of the electrolyte solution is the cerium salt.

4. The alkaline electrochemical cell of claim 3, wherein the cerium salt of the electrolyte solution comprises the cerium sulfate salt.

5. The alkaline electrochemical cell of claim 4, wherein the cerium sulfate salt of the electrolyte solution is selected from the group consisting of $Ce(SO_4)_2$ and $Ce_2(SO_4)_3$.

6. The alkaline electrochemical cell of claim 2, wherein the cerium additive is the cerium oxide.

7. The alkaline electrochemical cell of claim 6, wherein the cerium oxide is $CeO_2$.

* * * * *